US012668191B2

(12) United States Patent
 Pircon et al.

(10) Patent No.:   US 12,668,191 B2
(45) Date of Patent:   Jun. 30, 2026

(54) ALL TERRAIN VEHICLE

(71) Applicant: Polaris Industries Inc., Medina, MN (US)

(72) Inventors: John B. Pircon, Stacy, MN (US); Austin Bartz, Forest Lake, MN (US); Michael J. Fuchs, Blaine, MN (US); Boris Rubanovich, Oak Grove, MN (US); Tyler J. Kramer, St. Paul, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 347 days.

(21) Appl. No.: 18/409,234

(22) Filed: Jan. 10, 2024

(65) Prior Publication Data

US 2024/0239271 A1   Jul. 18, 2024

Related U.S. Application Data

(60) Provisional application No. 63/438,885, filed on Jan. 13, 2023.

(51) Int. Cl.
  *B60R 7/02*    (2006.01)
  *B60R 13/01*    (2006.01)

(52) U.S. Cl.
  CPC .............. *B60R 7/02* (2013.01); *B60R 13/013* (2013.01)

(58) Field of Classification Search
  CPC .......... B60R 7/02; B60R 13/013; B62K 5/01; B62K 7/04; B60K 1/02; B60K 1/04; B62J 9/10
  See application file for complete search history.

(56) References Cited

U.S. PATENT DOCUMENTS

| | | | | |
|---|---|---|---|---|
| 3,287,058 | A * | 11/1966 | Wells | ..................... B62D 53/06 |
| | | | | 280/789 |
| 4,800,470 | A * | 1/1989 | Hartsaw | .............. B60Q 1/2611 |
| | | | | 362/543 |
| 7,118,151 | B2 * | 10/2006 | Bejin | ........................ B60R 5/04 |
| | | | | 296/37.6 |
| 8,104,524 | B2 | 1/2012 | Manesh et al. | |
| 8,176,957 | B2 | 5/2012 | Manesh et al. | |
| 8,827,028 | B2 | 9/2014 | Sunsdahl et al. | |

(Continued)

FOREIGN PATENT DOCUMENTS

| | | | | | |
|---|---|---|---|---|---|
| CN | 114379436 | A | * | 4/2022 | |
| DE | 102021000859 | A1 | * | 3/2022 | .............. B60R 5/04 |
| JP | 2001322501 | A | * | 11/2001 | |

*Primary Examiner* — Lori Lyjak
(74) *Attorney, Agent, or Firm* — Merchant & Gould P.C.

(57)     ABSTRACT

A vehicle is provided. The vehicle may include an electric powertrain drivingly coupled to at least one of a plurality of ground engaging members. The vehicle may include an operator area supported by the frame and at least one of a front cargo area positioned forward of the operator area and a rear cargo area positioned rearward of the seating area. The rear cargo area may include a cargo box and at least one storage compartment. The at least one storage compartment may be arranged vertically below at least a portion of a floor panel of the cargo box and may include a plurality of discrete interior regions. The vehicle may include seating having extendable panels to form along with seat backs a support surface of a storage area in one arrangement. The storage area may include the floor of the cargo box.

19 Claims, 29 Drawing Sheets

(56)                    References Cited

U.S. PATENT DOCUMENTS

| | | | |
|---|---|---|---|
| 11,511,678 B2 | 11/2022 | Johnstun et al. | |
| 2013/0001267 A1* | 1/2013 | Infantino | B60R 9/045 |
| | | | 224/539 |
| 2014/0278104 A1* | 9/2014 | Proietty | G01C 21/3438 |
| | | | 701/400 |
| 2015/0329148 A1* | 11/2015 | Borowicz | B60N 2/04 |
| | | | 280/783 |
| 2020/0323515 A1 | 10/2020 | Levy | |
| 2021/0323402 A1 | 10/2021 | Stock et al. | |
| 2022/0032796 A1* | 2/2022 | Salter | B60L 50/66 |
| 2022/0135132 A1 | 5/2022 | Rodriguez et al. | |

* cited by examiner

ALL TERRAIN VEHICLE

CROSS-REFERENCE TO RELATED APPLICATIONS

The present disclosure claims priority to U.S. Provisional Application Ser. No. 63/438,885, filed Jan. 13, 2023, titled ALL TERRAIN VEHICLE, the complete disclosure of which is expressly incorporated by reference herein.

TECHNICAL FIELD

The present application relates to an electric vehicle including all-terrain vehicles ("ATVs") and utility terrain vehicles ("UTVs").

BACKGROUND

Vehicles configured for on-road and off-road travel, such as utility vehicles and all-terrain vehicles, may have various operating modes and performance capabilities. Such vehicles typically include combustion-based powertrain assemblies, which include a combustion engine. Hybrid and electric powertrains are less common among utility and all-terrain vehicles. Yet, given the societal and regulations-based emphasis on green technology and electric automobiles, a need exists for an electric utility/all-terrain vehicle.

SUMMARY

In an exemplary embodiment, a vehicle is provided. The vehicle comprising a frame including an upper frame portion and a lower frame portion; front and rear ground engaging members supporting the frame; an electric powertrain drivingly coupled to at least one of the front and rear ground engaging members; an operator area supported by the frame; and a rear cargo area arranged longitudinally rearward of the seating area. The rear cargo area defined by a cargo box and at least one storage compartment. The cargo box having a floor panel, a first side panel extending vertically upward form the floor panel, and a second side panel opposite the first side panel and extending vertically upward from the floor panel. The at least one storage compartment arranged vertically below at least a portion of the floor panel. The at least one storage compartment comprises a plurality of discrete interior regions.

In another exemplary embodiment, a vehicle is provided. The vehicle comprising a frame including an upper frame portion and a lower frame portion. The lower frame portion having a front lower frame portion, an intermediate lower frame portion, and a rear lower frame portion. The vehicle further comprising front and rear ground engaging members supporting the frame, an electric powertrain, and a seating area supported by the frame. The electric powertrain comprising one or more batteries electrically coupled to at least one inverter that is configured to supply a selected power to at least one motor that is configured to transfer via at least one gearcase mechanical power to at least one of the front and rear ground engaging members. The seating area including a front seating area and a rear seating area. The rear seating area having at least one seat including a seat base and a seat back, a floor area having a substantially flat profile, and at least one of the one or more batteries positioned in a gap extending vertically between the seat base and the floor area.

In a further exemplary embodiment, a vehicle is provided. The vehicle comprising a frame including an upper frame portion and a lower frame portion; front and rear ground engaging members supporting the frame; an electric powertrain drivingly coupled to at least one of the front and rear ground engaging members; a seating area supported by the frame having at least one seat; a rear cargo area arranged longitudinally rearward of the seating area, and a front cargo area arranged longitudinally forward of the seating area. The electric powertrain comprising at least one battery supported by the frame, a front motor operatively coupled to the at least one battery, and a rear motor operatively coupled to the at least one battery. The at least one battery is arranged vertically beneath the at least one seat. The rear cargo area defined by a cargo box having a floor panel, a first side panel extending vertically upward form the floor panel, and a second side panel opposite the first side panel and extending vertically upward from the floor panel, and at least one storage compartment arranged vertically below the floor panel. The at least one storage compartment including a plurality of discrete interior regions. The plurality of discrete interior regions includes at least a first discrete interior region independently accessible by a movement of at least a portion of the floor panel and an exterior openable barrier positioned lower than the floor panel. The front cargo area defined by a storage bin and a cargo rack rotatably coupled with the storage bin.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
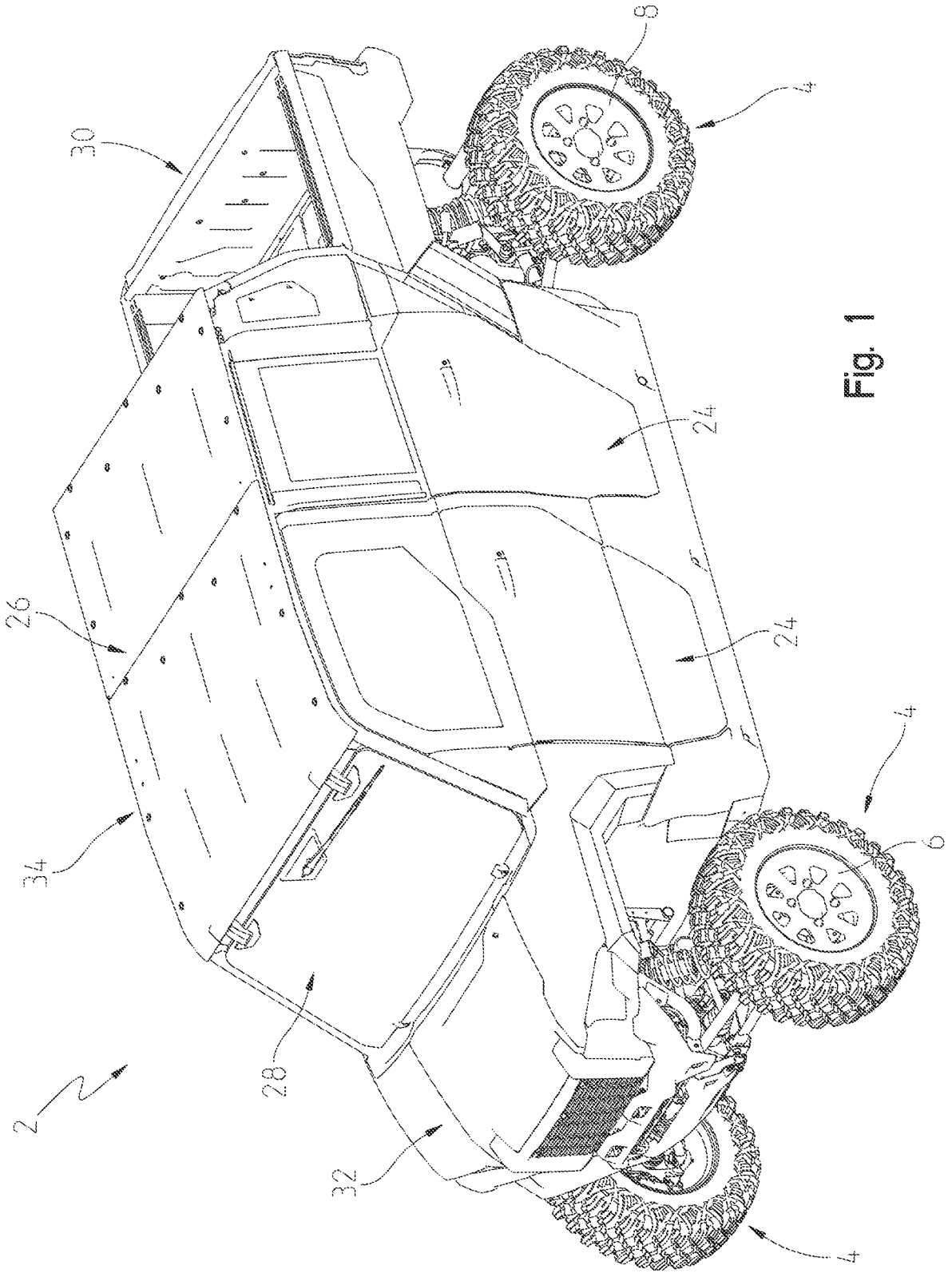
FIG. 1 is a front left perspective view of a utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 2:
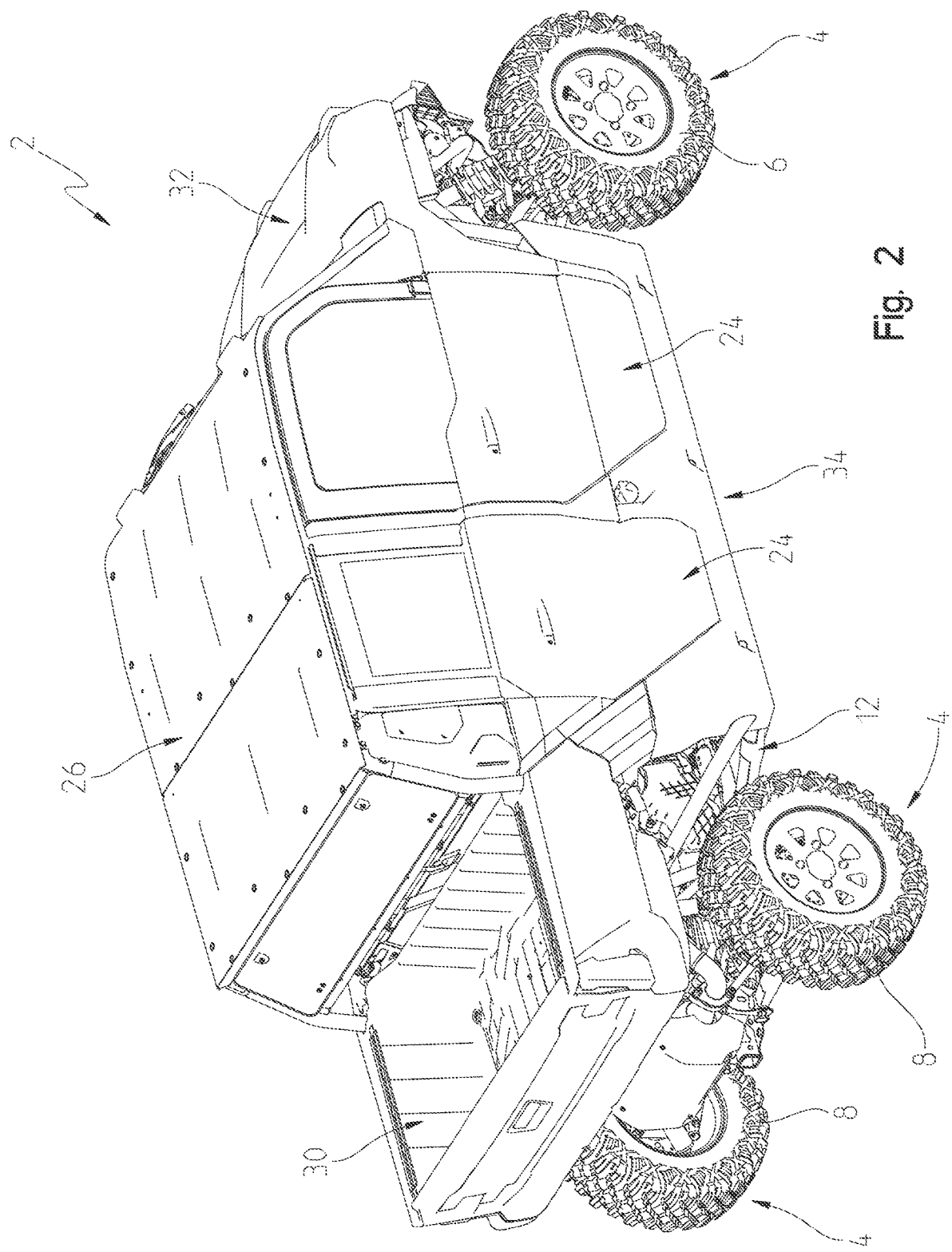
FIG. 2 is a rear left perspective view of the utility vehicle of FIG. 1.
Figure 3:
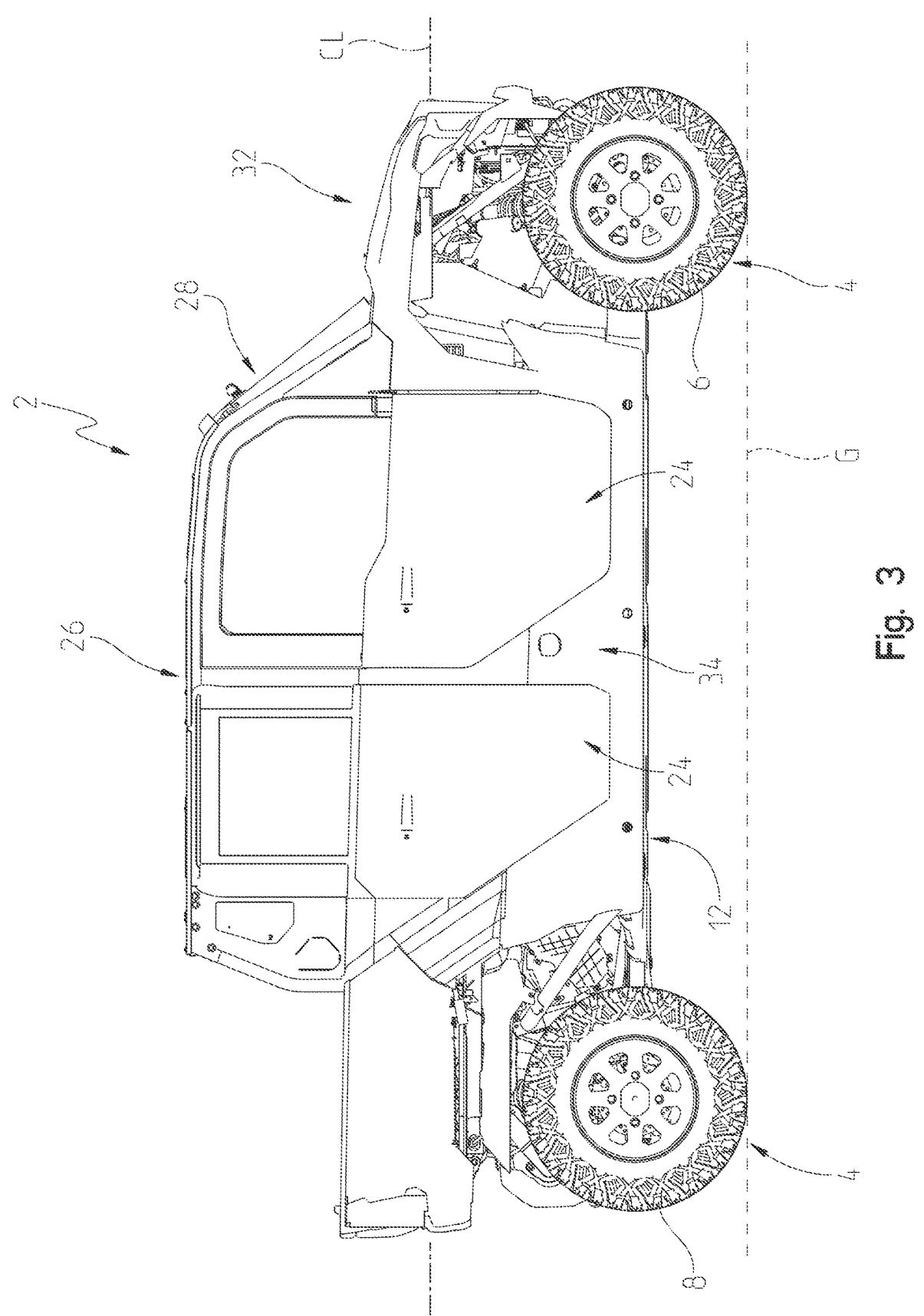
FIG. 3 is a right side view of the utility vehicle of FIG. 1.

Referring to FIGS. 1-3, an illustrative embodiment of a utility vehicle 2 is shown which is configured to traverse a variety of off-road terrains, including mud, rocks, dirt, and other trail or off-road conditions. Vehicle 2 may be referred to as a utility terrain vehicle ("UTV"), an all-terrain vehicle ("ATV"), or a side-by-side vehicle ("SxS") and is configured for travel over various terrains or surfaces. More particularly, vehicle 2 may be configured for military, industrial, agricultural, or recreational applications. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Vehicle 2 further includes a frame assembly 10 supported above a ground surface G (FIG. 3) by ground-engaging members 4. Frame assembly 10 supports a rear cargo area 30, a front cargo area 32 and a vehicle body 34, which includes a plurality of body panels. In some embodiments, front cargo area 32 may also be described as a front storage area and rear cargo area 30 may also be referred to as a rear storage area.

Additionally, and as shown in FIGS. 1-3, frame assembly 10 includes an upper frame assembly 20 extending vertically above a lower frame assembly 12. In one embodiment, the region bounded by upper frame assembly 20 and lower frame assembly 12 and generally longitudinally between rear and front cargo areas 30, 32 is referred to as an operator area 36 of vehicle 2. Upper frame assembly 20 will be described further herein with reference to FIGS. 4 and 5. As shown in FIGS. 1-3 and FIGS. 12-13, operator area 36 includes front seating 38 for an operator or driver and a passenger. Illustratively, front seating 38 includes an operator seat 40 and a passenger seat 42. Vehicle 2 further includes rear seating area 44 for accommodating at least one rear seat 46. In some embodiments, rear seating area 44 may include left rear seat 46 and a right rear seat 48. Front and rear seating 38, 44 will be described further in detail with reference to FIGS. 12-13. Further, as illustrated in FIGS. 1-3, operator area 36 may be enclosed such that operator area 36 is enclosed with a plurality of doors 24, a roof 26, and a windshield 28. However, in other embodiments, operator area 36 may not be enclosed and instead is an open-air operator area. In further embodiments, the enclosure surrounding operator area 36 may be removable such operator area 36 may be enclosed and/or open dependent on an operator's preference.

Figure 4:
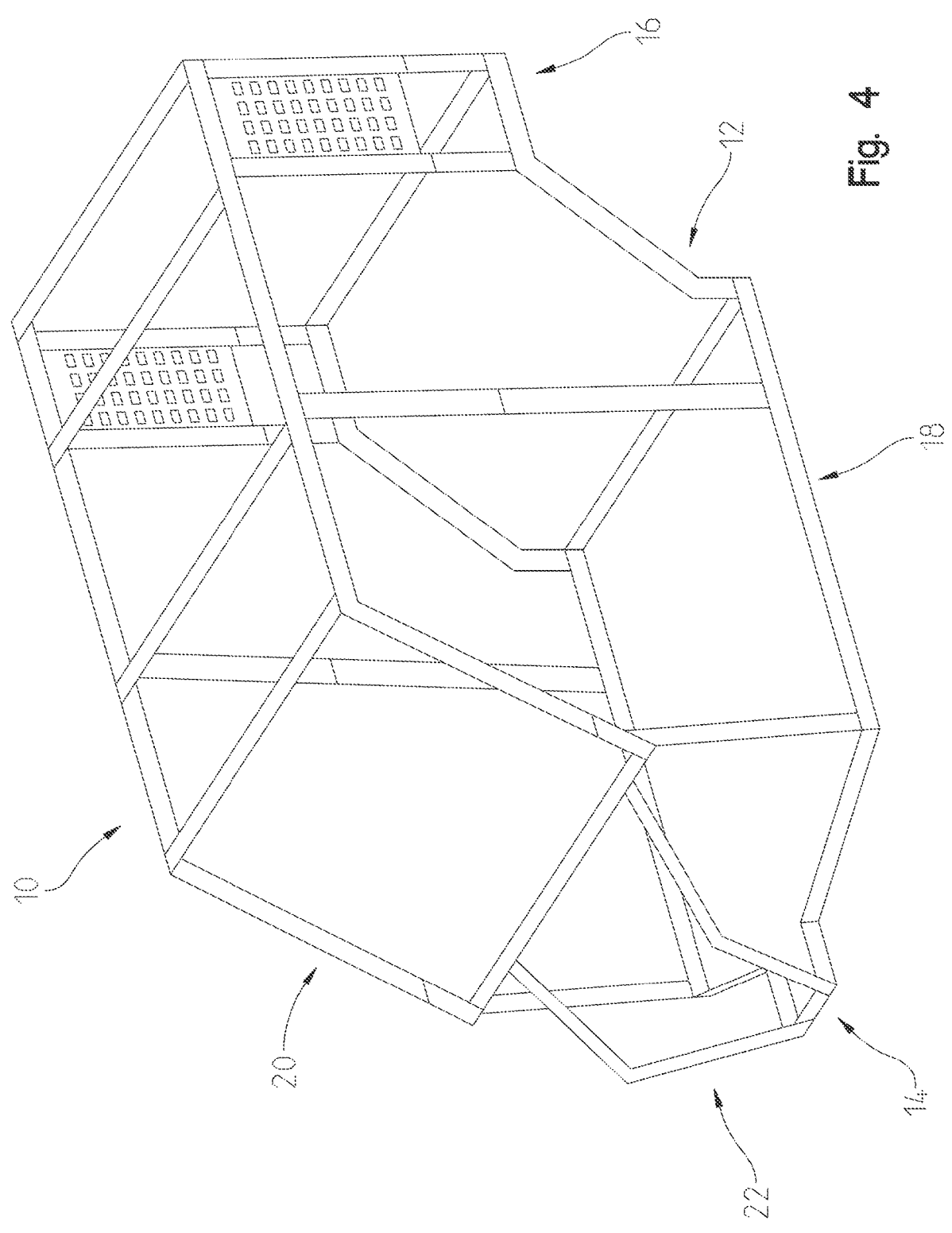
FIG. 4 is a left front perspective view of a representative frame assembly of the utility vehicle of FIG. 1.
Figure 5:
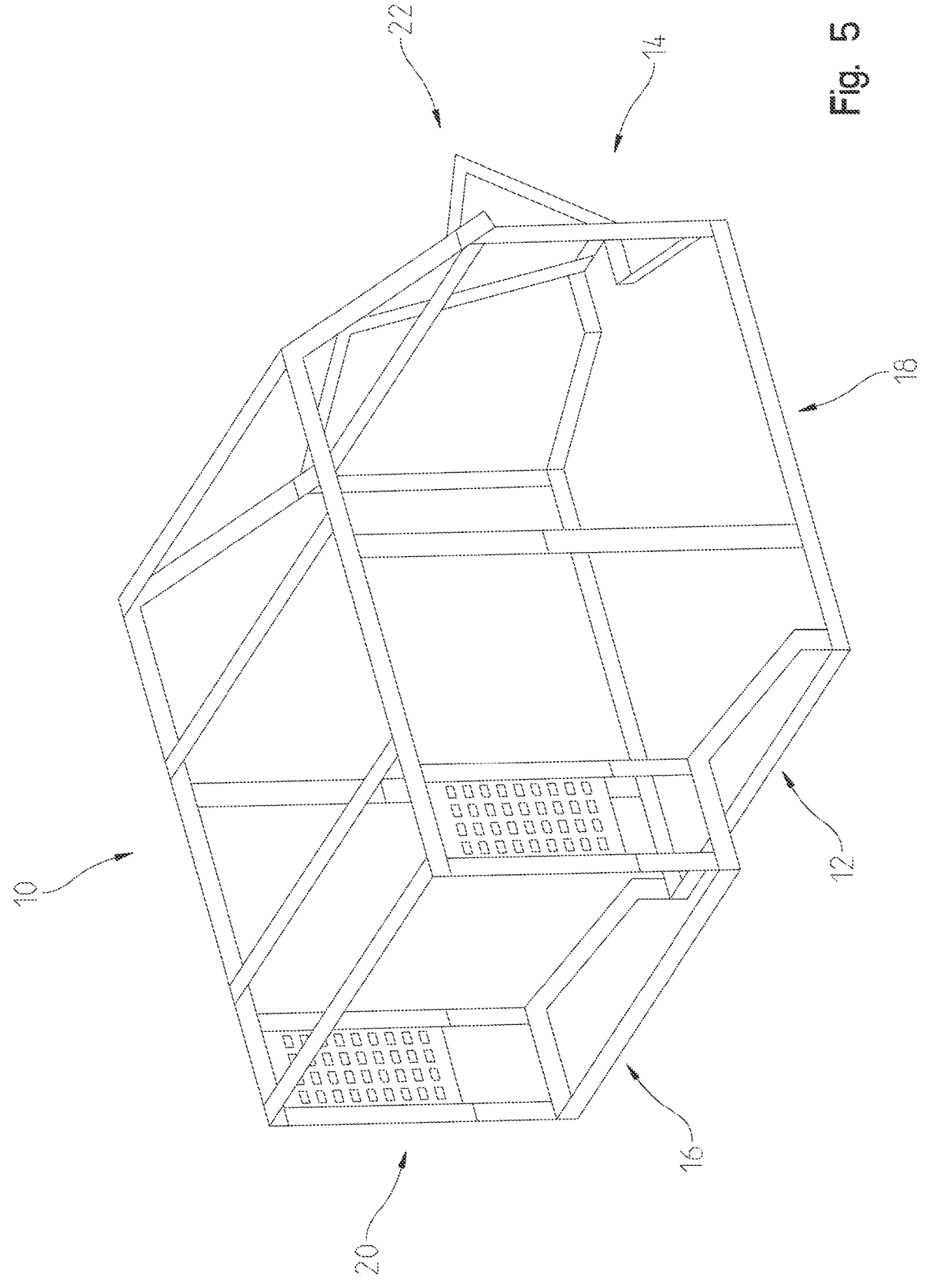
FIG. 5 is a right rear perspective view of the frame assembly of FIG. 4.

As illustrated in FIGS. 4 and 5, frame assembly 10 includes upper frame assembly 20 and lower frame assembly 12. Lower frame assembly 12 defines a front frame portion 14, a rear frame portion 16, and an intermediate frame portion 18 extending generally longitudinally therebetween. Front frame portion 14 includes a frontmost portion 22 configured for supporting at least a portion of a powertrain assembly 50 (FIG. 6) of vehicle 2, for example a front drive or gearbox of vehicle 2, as will be described further herein. As will be described further with reference to FIGS. 19-25, frontmost portion 22 of lower frame assembly 12 may also be configured for accommodating front cargo area 32. The various advantages provided by the configuration of frame assembly 10 may be due to reduced space required for housing powertrain assembly 50, which may be an electric powertrain assembly 50, an internal combustion engine powertrain assembly, or a hybrid powertrain assembly, such as a combination of an internal combustion engine powertrain assembly and an electric powertrain assembly.

Figure 6:
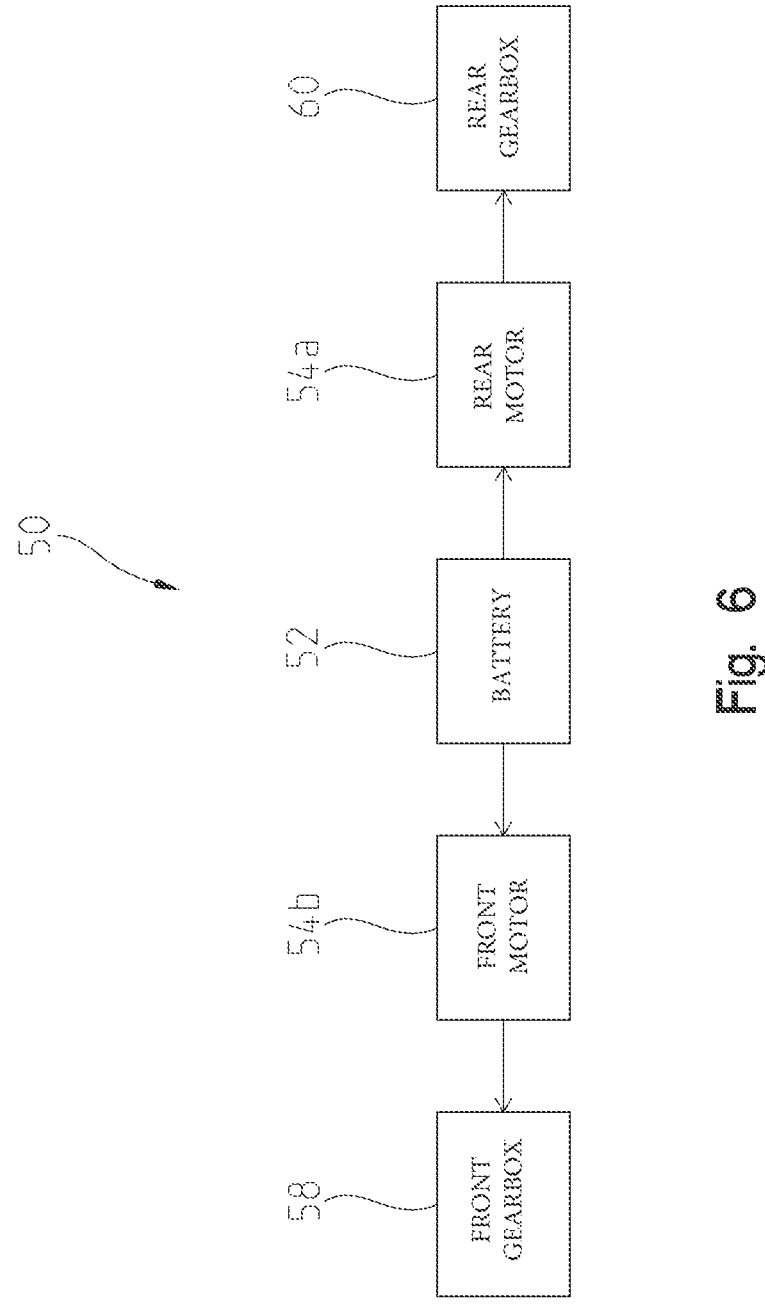
FIG. 6 is a left side view of a powertrain assembly for use with the utility vehicle of FIG. 1.
Figure 7:
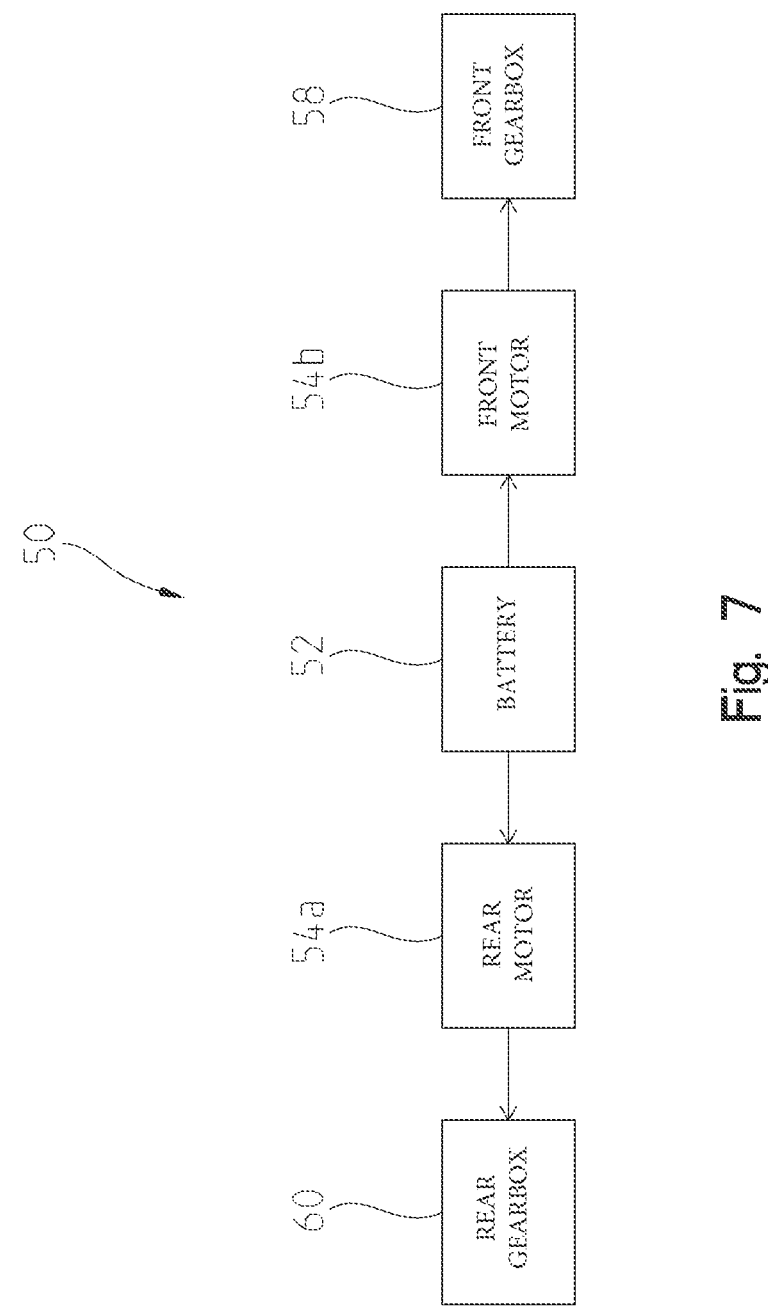
FIG. 7 is right side view of the powertrain assembly of FIG. 6.

FIGS. 6 and 7 illustrates an exemplary electronic powertrain assembly 50 for use with vehicle 2 and that is supported by frame assembly 10. More particularly, powertrain assembly 50 does not include an internal combustion engine and, instead, power is provided by one or more batteries operably coupled to one or more motors, as disclosed further herein. Powertrain assembly 50 includes at least one battery 52, at least one motor 54, at least one inverter 56, a front differential or gearbox 58, and a rear differential or gearbox 60. Various embodiments of powertrain assembly 50 of vehicle 2 include a rear motor 54*a* and a front motor 54*b*. Rear motor 54*a* is operably coupled to rear wheels 8 through rear differential 60 and front motor 54*b* may be operably coupled to front wheels 6 through front differential 58. Front and/or rear differential(s) 58, 60 may be configured as clutch packs, planetary gear sets, helical gear sets, open differentials, limited-slip differentials, locked differentials, Salisbury limited-slip differentials, positraction differentials, or any variant or combination of the above or similar mechanisms configured to transmit power or alter torque at any of ground-engaging members 4. For example, a clutch may be used in combination with and/or in lieu of front or rear differential 58, 60 for decoupling front and/or rear motors 54*b*, 54*a* from one or more ground-engaging members 4. This may contribute to increased efficiency and customized control by an operator.

Various embodiments of portions of powertrain assembly 50 may be disclosed further in U.S. Patent Application Publication No. 2021/0323402, filed on Apr. 16, 2021, the complete disclosure of which is expressly incorporated by reference herein. Further, various embodiments of portions of powertrain assembly 50 may be disclosed further in U.S. patent application Ser. No. 17/946,265, filed Sep. 16, 2022, the complete disclosure of which is expressly incorporated by reference herein. The present disclosure may be used in combination with the active agility system disclosed in U.S. Patent Application Publication No. 2020/0323515, filed Apr. 20, 2021, the complete disclosure of which is expressly incorporated by reference herein. Additionally, various aspects of vehicle 2 may be disclosed in U.S. Patent Application Publication No. 2022/0135132, filed on Nov. 13, 2020, the complete disclosure of which is expressly incorporated by reference herein.

Front differential 58 is operably coupled to front wheels 6 (FIGS. 1-3) through front half shafts or axles (not shown) and rear differential 60 is operably coupled to rear wheels 8 through rear half shafts or axles (not shown). In some embodiments, front motor 54*b* may be positioned forward of frame assembly 10 and towards frontmost portion 22 of frame assembly 10. However, in further embodiments, front motor 54*b* may be arranged rearward of frontmost portion 22 of frame assembly 10. In further embodiments, various other arrangements of front motor 54*b* may be incorporated. Similarly, a variety of arrangements of rear motor 54*a* relative to front motor 54*b* and/or to frame assembly 10 may be incorporated.

Figure 8:
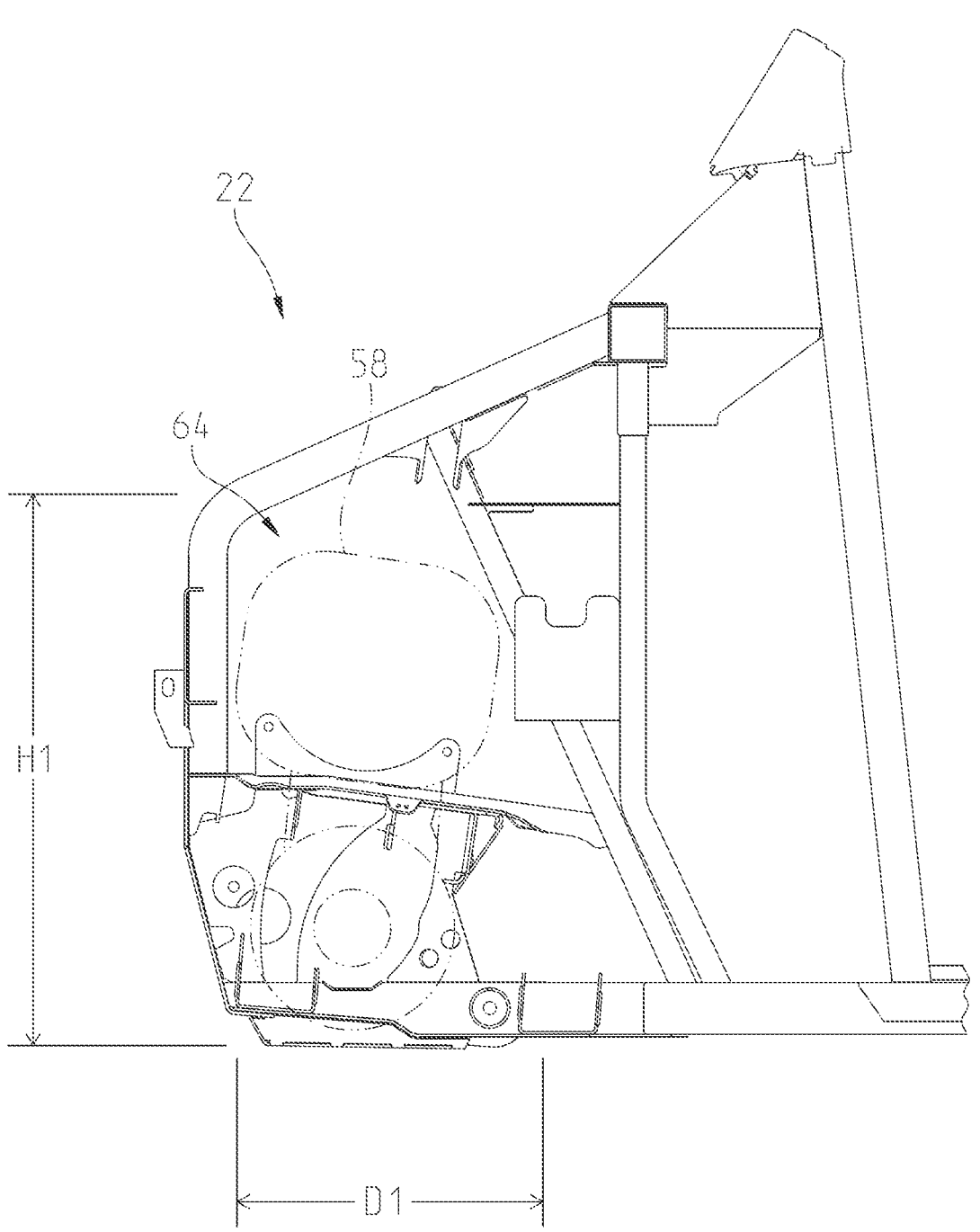
FIG. 8 is a left side view of a portion of the frame assembly of FIG. 4 with a portion of the powertrain assembly of the present disclosure.
Figure 9:
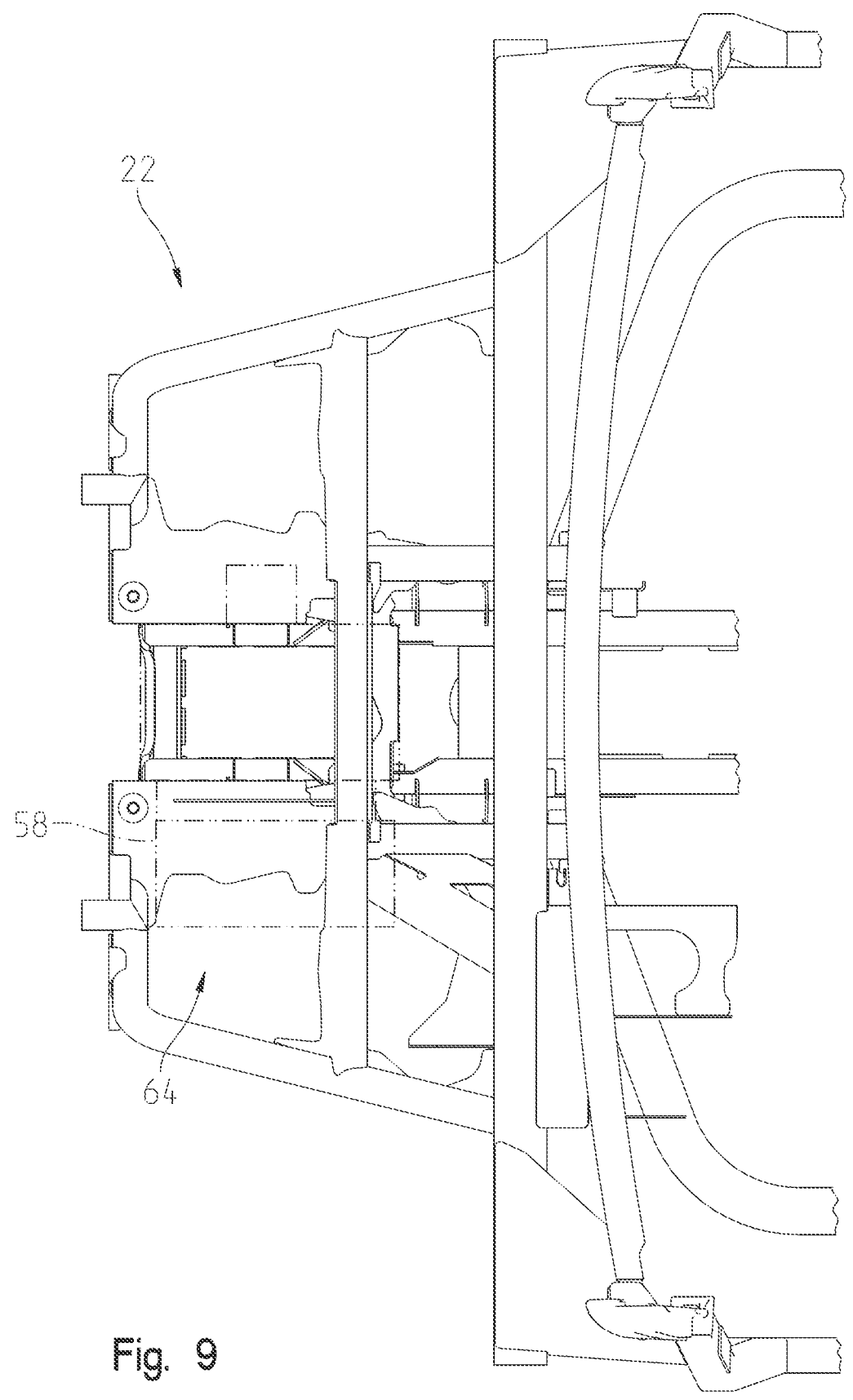
FIG. 9 is a top view of the portion of the frame assembly of FIG. 8.

As previously mentioned, powertrain assembly 50 includes front gearcase 58 which may be arranged towards a longitudinally forward point of powertrain assembly 50 and frame assembly 10. Frame assembly 10 may be configured such that front gearcase 58 may be received and arranged within frontmost portion 22 of frame assembly 10. For example, FIG. 8 illustrates a side view of frontmost portion 22 of frame assembly 10. As illustrated, frontmost portion 22 accommodates at least a portion of the front drive, and more particularly gearbox 58, shown in phantom. For example, as illustrated in FIGS. 8-9, frontmost portion

22 defines an opening 64 configured for housing gearbox 58 having a height H1, a width (not shown), and a depth D1. In this way, gearbox 58 may be received into opening 64 from a position forward of frame assembly 10 and supported by at least a portion of frame assembly 10 within opening 64. In embodiments, frame assembly 10 includes a removable frame member, such as a laterally centered frame member, which may be removed to provide access to gearbox 58. An exemplary frame assembly with a removable frame member to provide access to a powertrain components is disclosed in U.S. Pat. No. 8,827,028, issued Sep. 9, 2014, titled SIDE-BY-SIDE ATV, the complete disclosure of which is expressly incorporated by reference herein.

Figure 10:
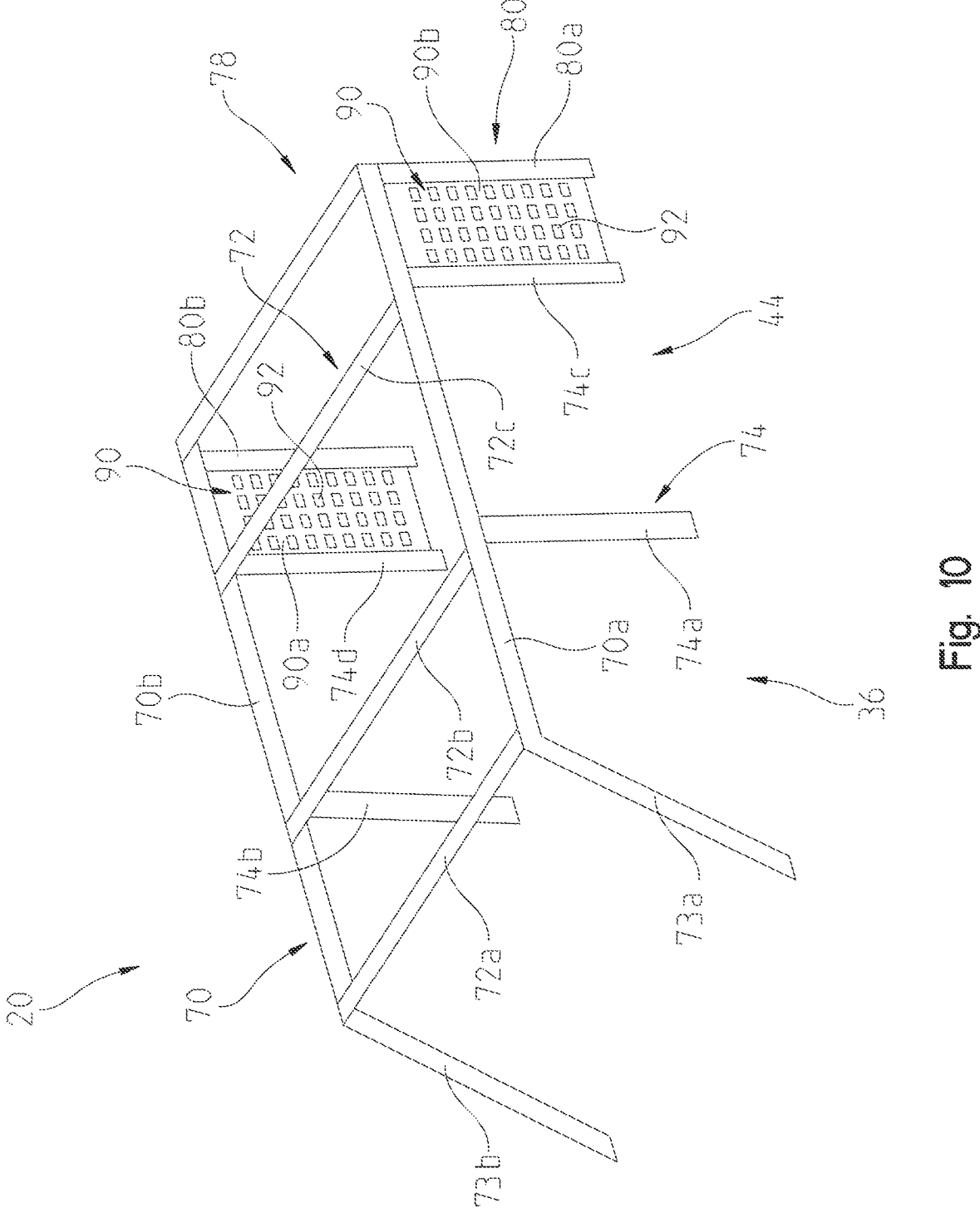
FIG. 10 is a left front perspective view of an upper portion of the frame assembly of FIG. 4.
Figure 11:
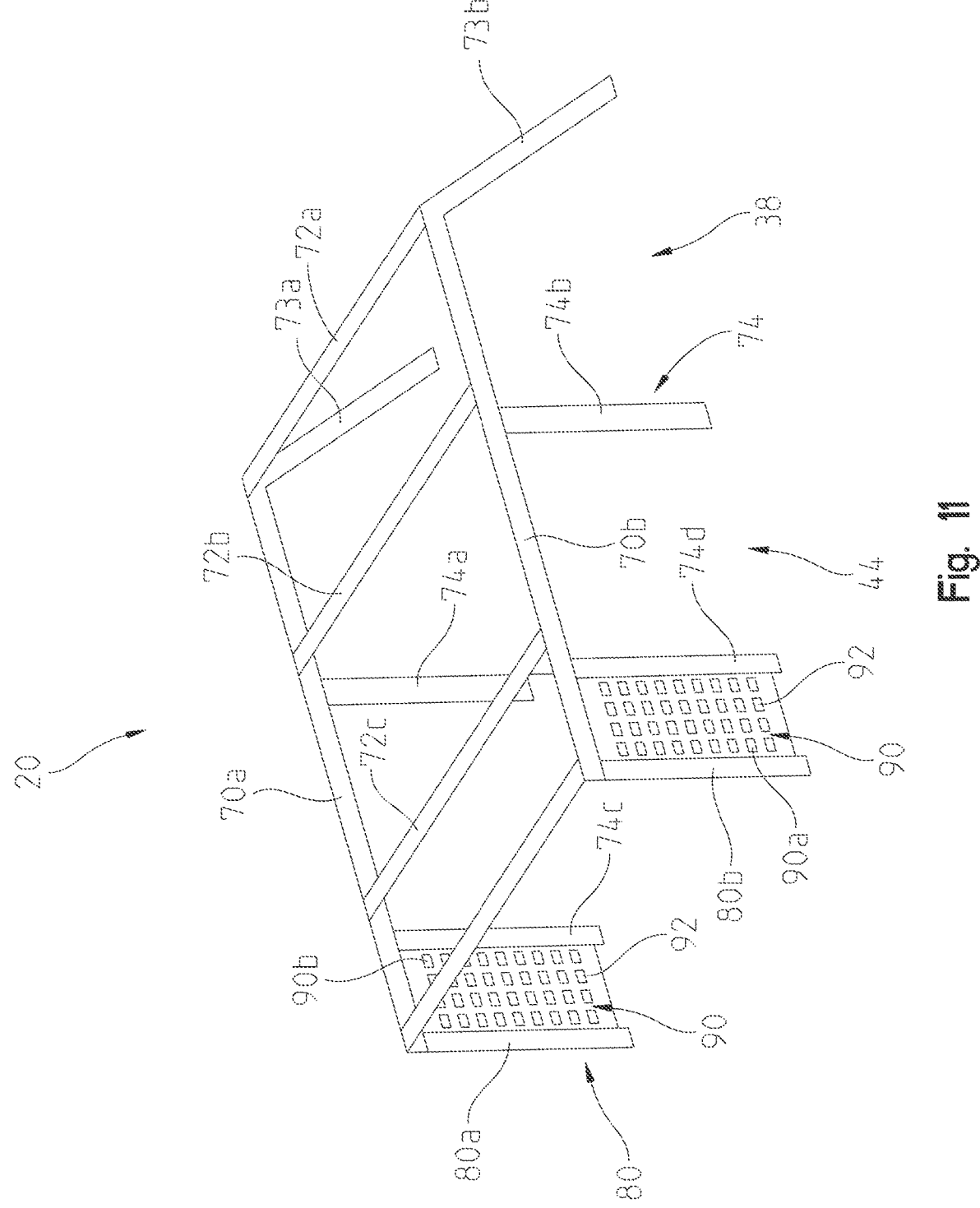
FIG. 11 is a rear right perspective view of the upper portion of the frame assembly of FIG. 10.

With reference now to FIGS. 10 and 11, upper frame assembly 20 and operator area 36 for vehicle 2 will be described further. More particularly, FIG. 10 shows a front perspective view of upper frame assembly 20 having a pair of longitudinally extending frame members 70 spaced laterally from one another and coupled with a plurality of laterally extending frame members 72. For example, FIG. 10 illustrates longitudinally extending frame members 70 including a first longitudinally extending frame member 70*a* and a second longitudinally extending frame members 70*b*. Further, laterally extending frame members 72 include a first laterally extending member 72*a*, a second laterally extending member 72*b*, and a third laterally extending member 72*c*. However, in further embodiments, any number of laterally extending members 72 may be incorporated. Further, with reference still to FIGS. 10 and 11, upper frame assembly 20 comprises a four pillar arrangement wherein a first pair of vertically extending frame members 73*a* and 73*b* correspond to A pillars, a second pair of vertically extending frame members 74*a* and 74*b* correspond to B pillars, a third pair of vertically extending frame members 73*c* and 73*d* correspond to C pillars, and a fourth pair of vertically extending frame members 80*a* and 80*b* correspond to D pillars. Each of A-D pillars are configured for coupling with lower frame assembly 12, such as with bolts or other suitable coupling arrangements. As will be described further herein, D pillars 80*a*, 80*b* may be used in combination with C pillars 74*c*, 74*d* for supporting storage racks.

For example, as illustrated in FIGS. 10 and 11, upper frame assembly 20 includes storage racks 90, where, illustratively, a first storage rack 90*a* is coupled between pillar 74*c* and pillar 80*a* while a second storage rack 90*b* is coupled between pillar 74*d* and pillar 80*b*. Storage racks 90 may include a plurality of interfaces 92 configured for receiving accessories and/or providing locations at which accessories may be coupled to storage racks 90. In some embodiments, the plurality of interfaces 92 include a plurality of apertures defined by storage racks 90. However, various other examples of interfaces may be incorporated. In some embodiments, plurality of interfaces 92 may receive coupling or retention features, for example, in some embodiments, ties, ropes, cords, clamps, and/or a retainer system. An example retainer system may be the same as or substantially similar to the retainer system described in U.S. Patent Application Publication No. 2022/0024390, titled "Article Mounting System for a Vehicle," filed on Jun. 20, 2021, or U.S. Provisional Patent Application No. 63/357,204, titled "Cargo Area for Utility Vehicle," filed Jun. 30, 3022, the entire contents of which are incorporated herein by reference, may be used as the coupling mechanism described herein. In this way, a variety of different tools or cargo may be releasably mounted onto upper frame assembly 20 and carried or supported before, during, or after operation of vehicle 2.

With reference now to FIGS. 12-14C, the ability of frame assembly 10 to accommodate front seating and rear seating will be described further. As illustrated, frame assembly 10 accommodates front seating 38, illustratively a first or operator seat 40 and a second or passenger seat 42, and, depending on the size of vehicle 2, also may accommodate rear seating area 44, illustratively a first or left rear seat 46 and a second or right rear seat 48. While front and rear seating 38, 44 accommodates at least four passengers, passenger seat 42 and one or both of rear seats 46, 48 may be pivoted downwardly into a stored configuration to increase storage space within vehicle 2. For example, each seat may include a seat back configured to be pivoted downwardly for storing the seats. Passenger seat 42 includes a seat back 66a, left rear seat 46 includes a seat back 66b and right rear seat 48 includes a seat back 66c. As indicated by arrows A, any of seat backs 66a-66c may be actuated for pivoting forwardly and downwardly to collapse onto seat bottoms or bases of any one of seats 42, 46, 48 into a folded configuration.

Figure 12A:
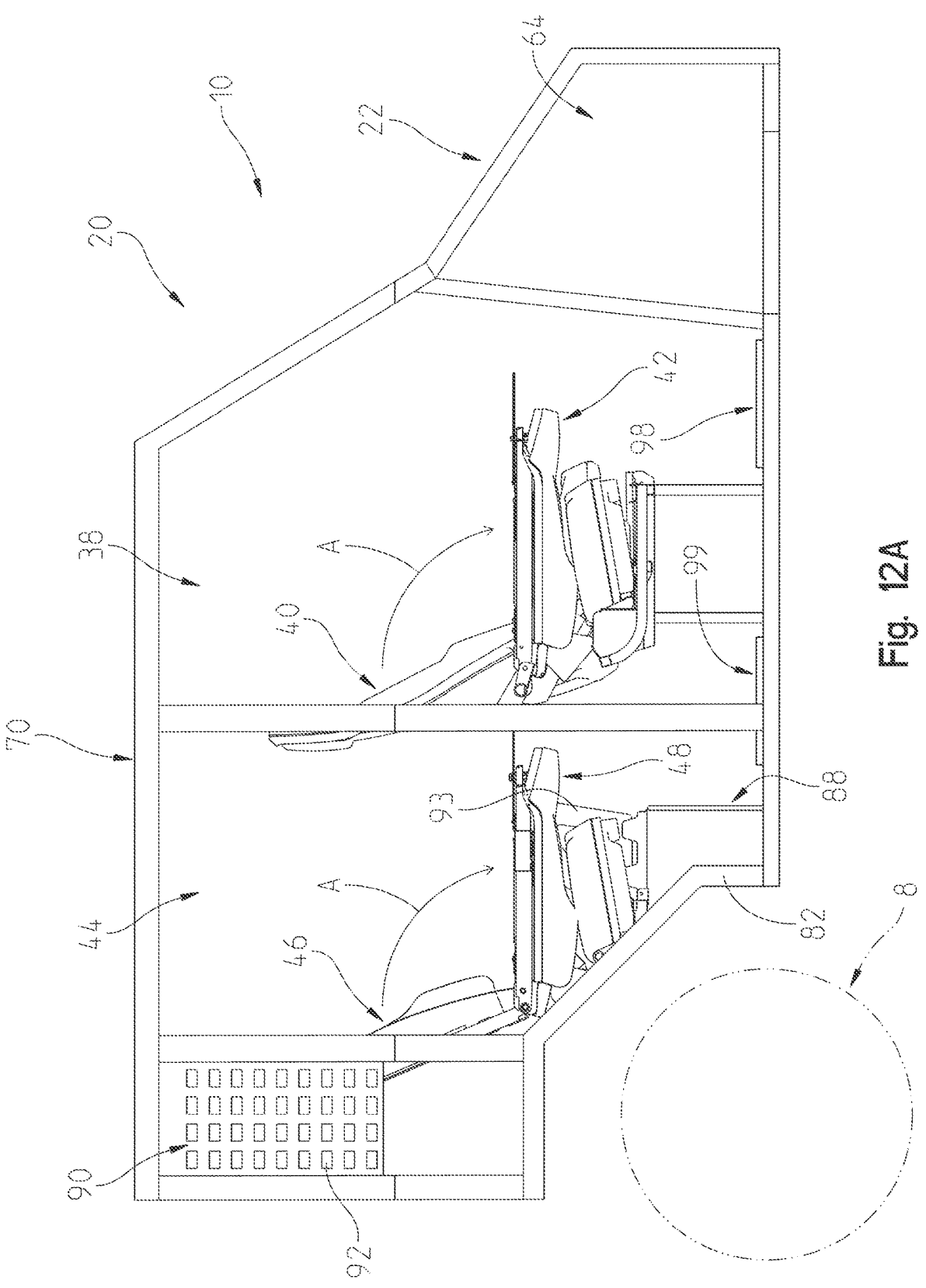
FIG. 12A is a right side view of the frame assembly of FIG. 4 and a seating assembly in accordance with embodiments of the present disclosure.
Figure 12B:
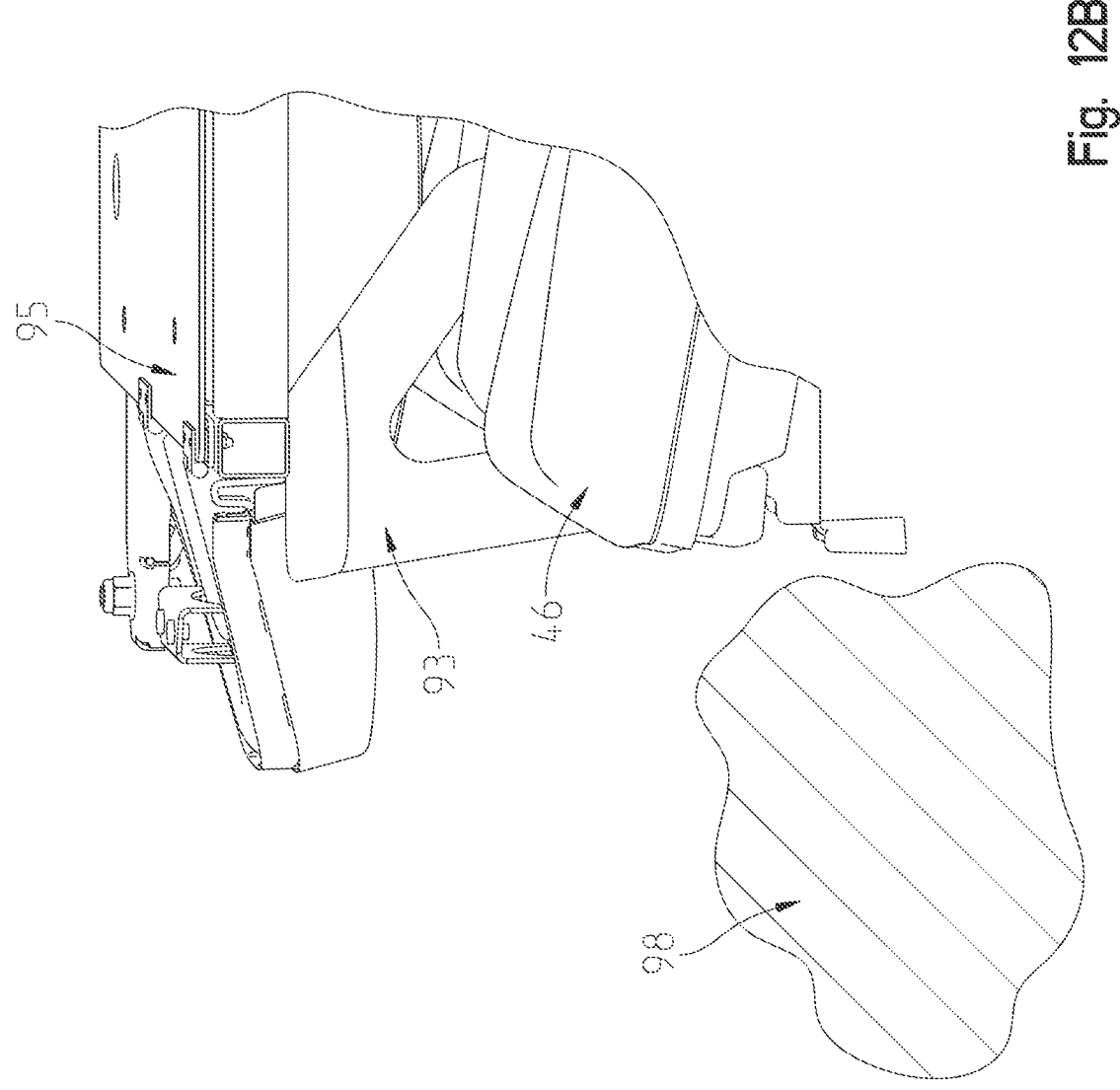
FIG. 12B is an enlarged side view of a portion of the frame assembly and seating assembly of FIG. 12A.

Further, as illustrated in FIGS. 12A and 12B, rear seating area 44 may include a center hand bar 93 arranged laterally between rear seats 46, 48 which may act as a stop for rear seat backs 66b, 66c when folded down into the folded configuration. For example, as illustrated in FIG. 12B, each of rear seats 46, 48 may have at least one protrusion 95 that engages with rear seats 46, 48 to prohibit rear seats 46, 48 from folding downwardly passed a desired position. In other words, center hand bar 93 allows for rear seats 46, 48 to be lowered to a height in the collapsed or folded configuration that is approximately equal to a height of rear cargo area 30 (FIG. 1) of vehicle 2 to create a continuous storage surface or area extending continuously between rear cargo area 30 and rear seating area 44. In embodiments, center hand bar 93 is separately removably coupled to the frame and the seat frame, such as with bolts either threaded into the frame and seat frame or secured to the frame and seat frame with nuts. By having center hand bar 93 removable access may be provided to various components, such as one of the at least one batteries 52.

Figure 13A:
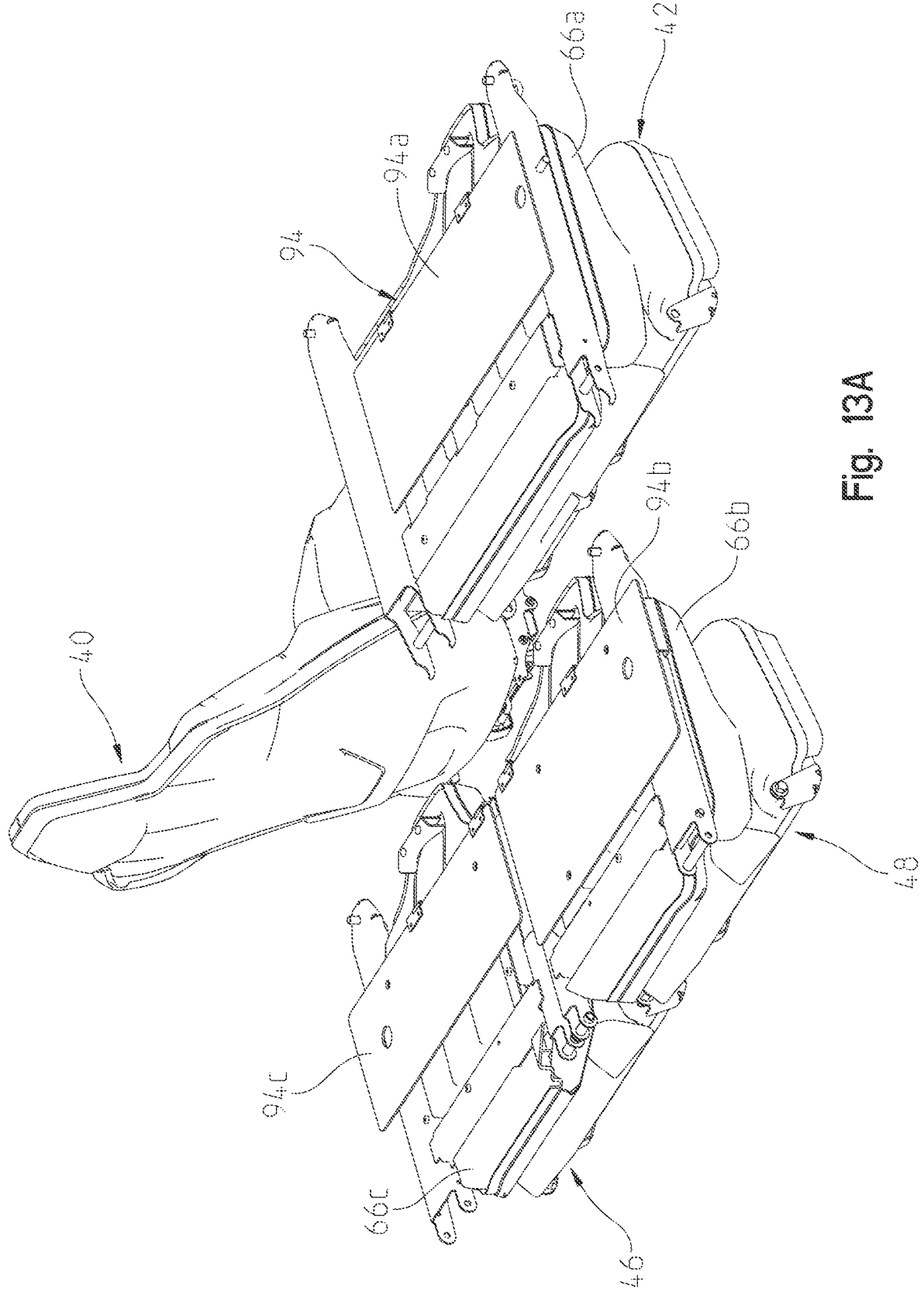
FIG. 13A is a right rear perspective view of the seating assembly of FIG. 12A with a seat back of the operator seat in a raised position and the remaining seat backs in a lowered position with foldable panels in a non-extended or stored position.
Figure 13B:
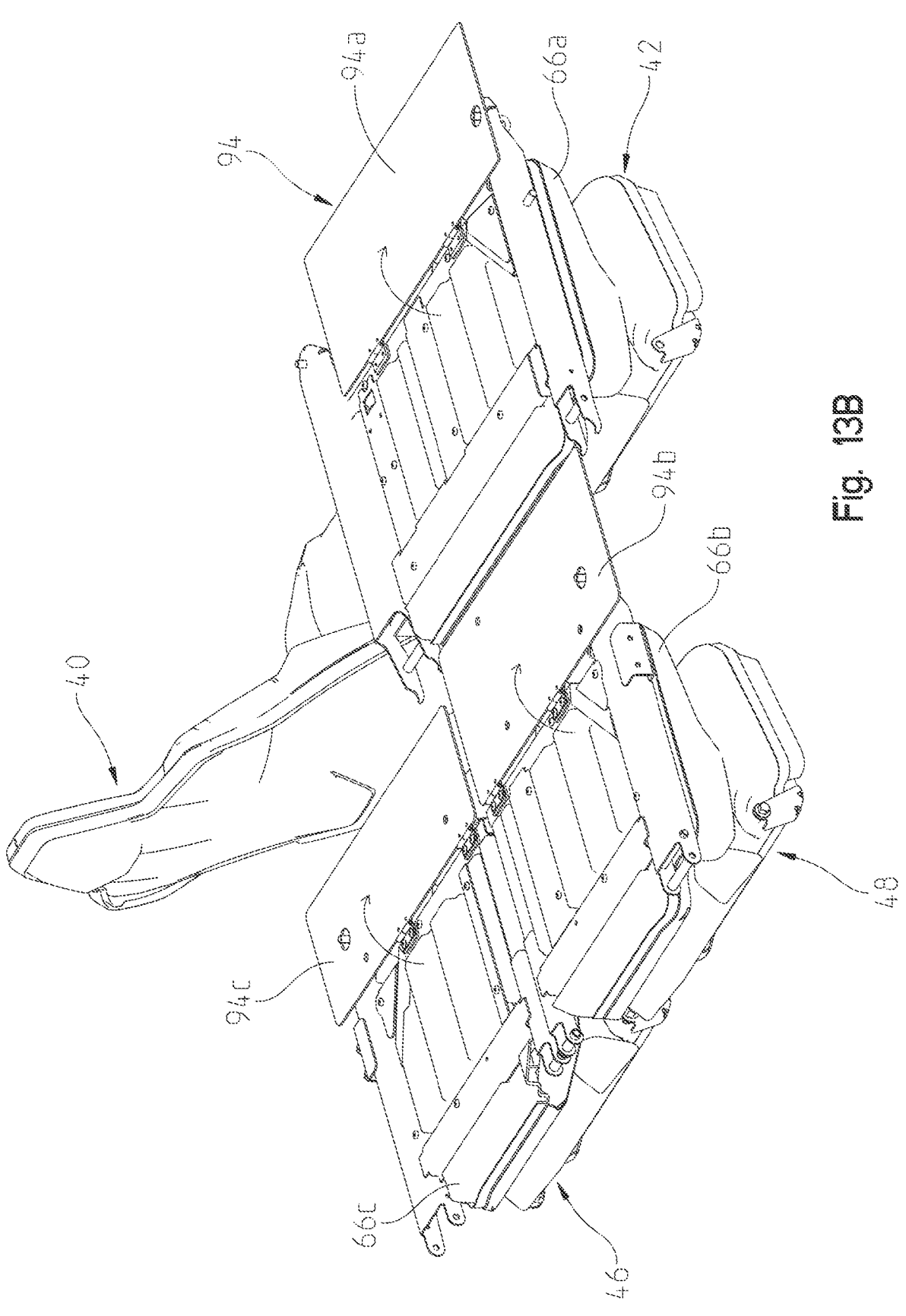
FIG. 13B is the seating assembly of FIG. 13A with the foldable panels of the non-operator seatbacks each in an extended position.

FIGS. 13A and 13B illustrates a perspective view of operator and passenger seats 40, 42 and rear seats 46, 48. Referring to FIG. 13A, passenger seat 42 and rear seats 46, 48 are moved or folded into the downward or stored configuration. As illustrated, a rear surface of seat back 66a-66c of each seat 42, 46, 48 comprises one of a plurality of panels 94 coupled thereto. Each panel 94 is pivotable relative to a hinge assembly 96 that allows for a portion or section of panels 94 to rotate relative to seat backs 66a-66c. For example, FIG. 13A illustrates each of the plurality of panels 94 in the folded or pre-deployed configuration and FIG. 13B illustrates each of the plurality of panels 94 in the pivoted or extended configuration after rotation about hinge assemblies 96 relative to respective seat backs 66a-66c. When panels 94 are arranged in the extended configuration, panels 94 work with seat backs 66 of seats 42, 46, 48 to define a generally horizontal or level surface that is generally aligned with a floor of cargo area 30 (see for example FIG. 25C) to increase the space available within vehicle 2 and increase the surface area available for tools or other cargo items. In some embodiments, when panels 94 are arranged in the extending configuration, accessory retaining features may be coupled with panels 94 or rear surfaces of seat backs 66 of seats 42, 46, 48 for securing tools and/or other cargo. For example, similar to as previously described, in some embodiments, ties, ropes, cords, clamps, and/or a retainer system, e.g., as described above, may be incorporated with panels 94 and used as the coupling mechanism described herein.

Figure 14A:
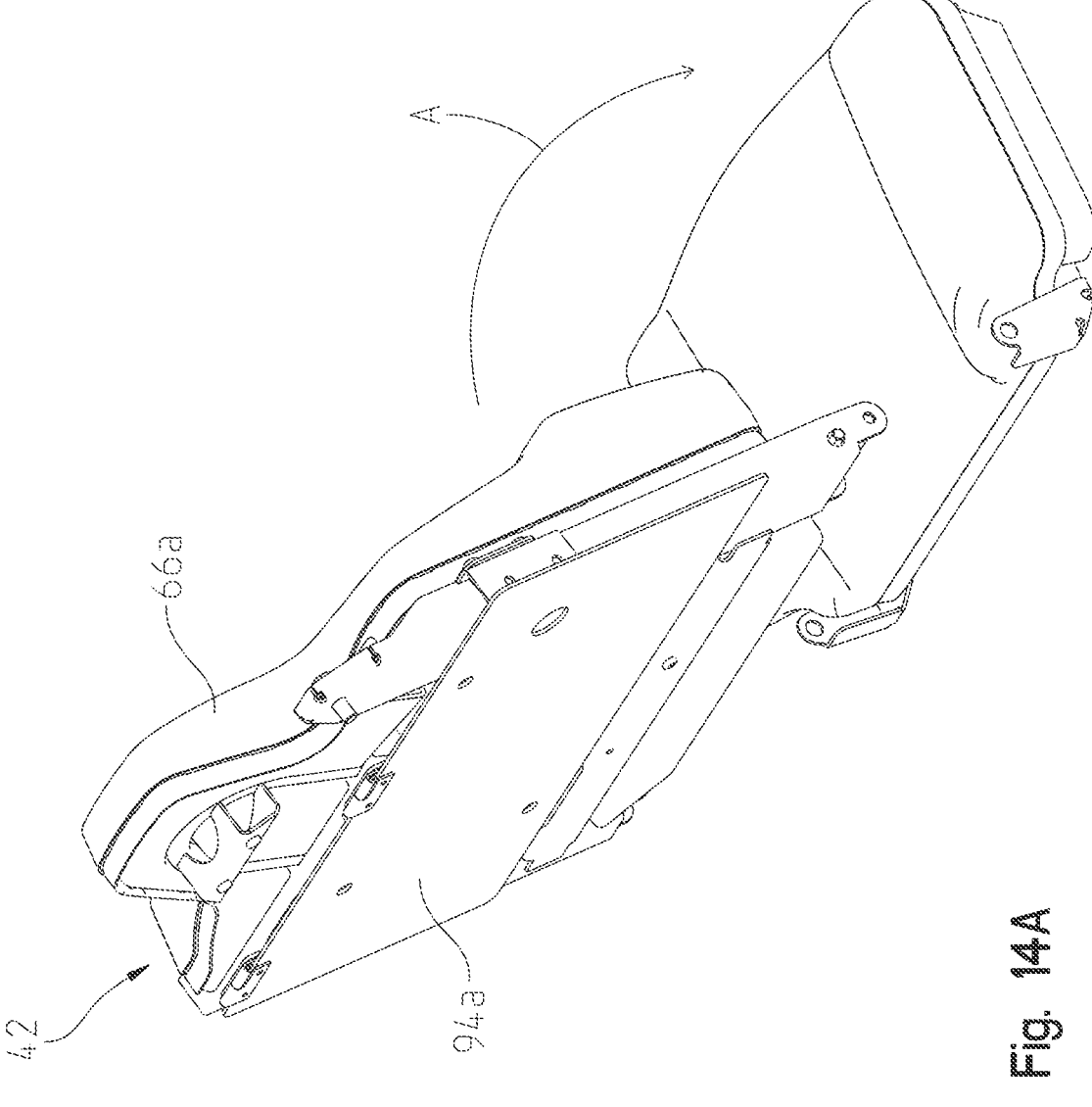
FIG. 14A is a right rear perspective view of at least one seat of the seating assembly of FIG. 13A with the seatback in a raised position and the foldable panel in the non-extended position.
Figure 14B:
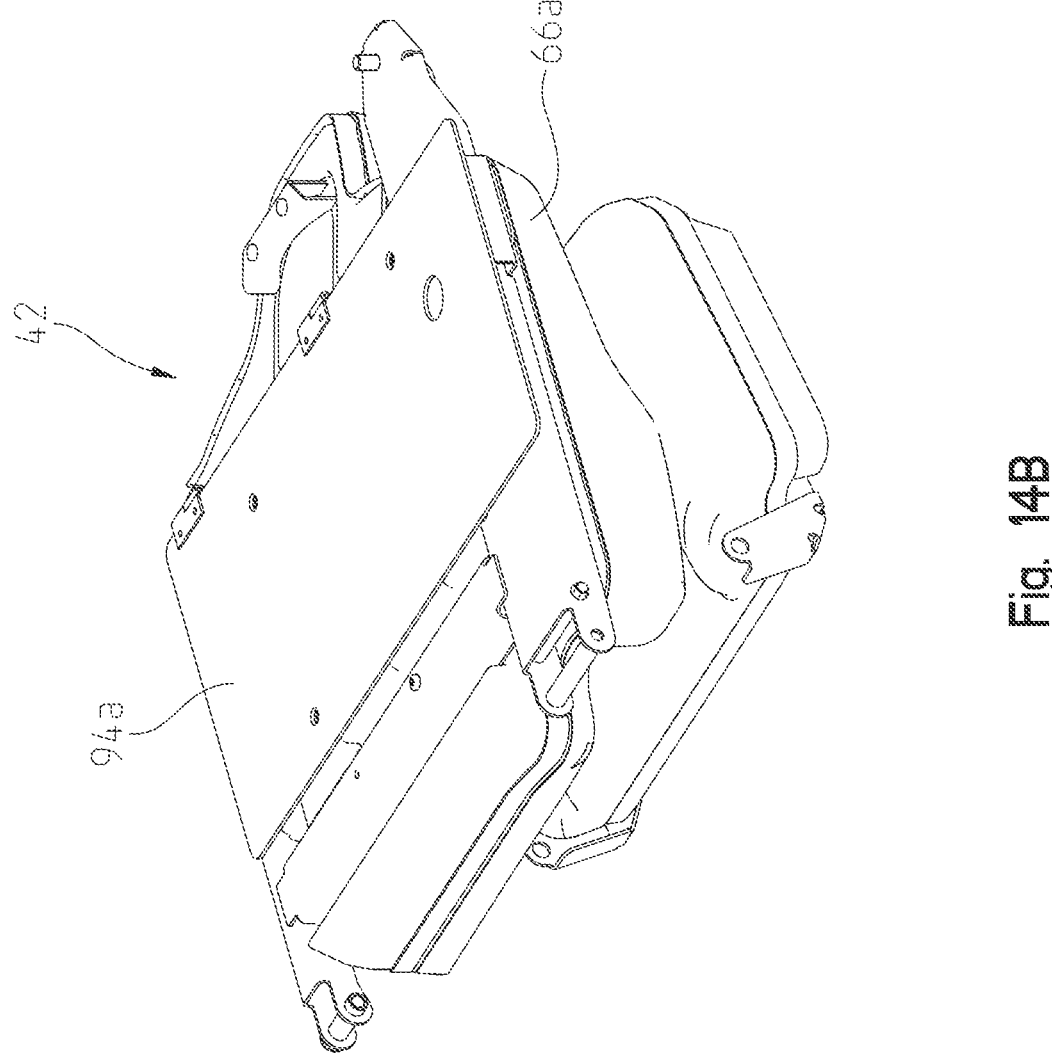
FIG. 14B is a right rear perspective view of at least one seat of FIG. 14A with the seatback in a lowered or folded position and the foldable panel in the non-extended position.
Figure 14C:
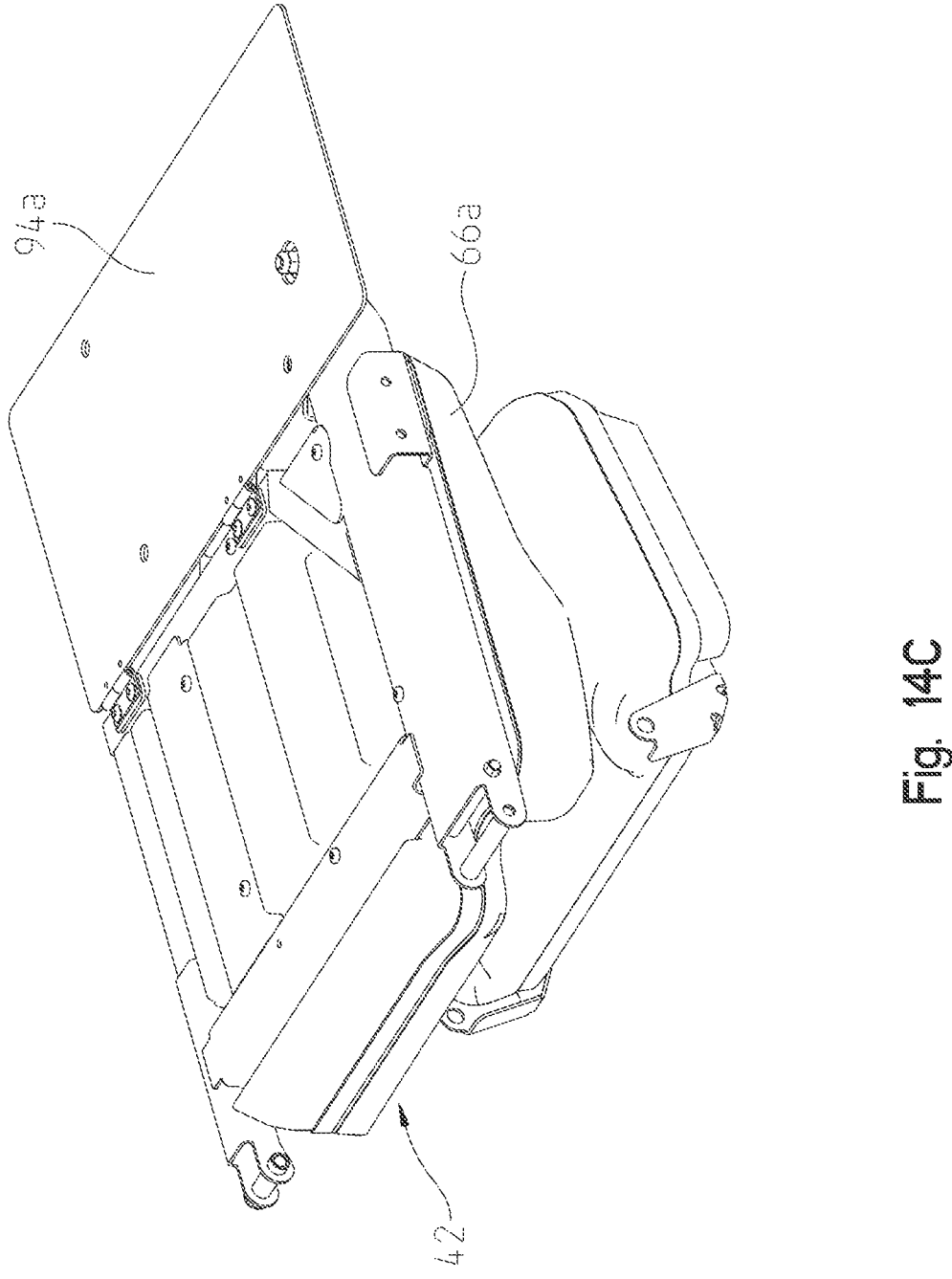
FIG. 14C is a right rear perspective view of at least one seat of FIG. 14A with the seatback in a lowered or folded position and the foldable panel in the extended position.

FIG. 14A illustrates a perspective view of one seat, for example passenger seat 42, arranged in the upright configuration having a panel 94a coupled with rear surface of seat back 66a of passenger seat 42 and prior to extension of panel 94a. In FIG. 14B, seat back 66a of passenger seat 42 is shown in the folded configuration with panel 94a still in the non-extended position. In FIG. 14C, seat back 66a of passenger seat 42 is shown in the folded configuration with panel 94a in the extended position.

While transitioning any one of passenger seat 42 and rear seats 46, 48 into the downward or folded position may increase the storage space available for cargo in vehicle 2, powertrain assembly 50 and frame assembly 10 are also configured to increase space available on vehicle 2 for storing or supporting various vehicle components or cargo. For example, powertrain assembly 50 and frame assembly 10 may provide increased open or storage areas within a foot area of rear seating 44, compared to vehicles having different powertrain assemblies, such as ones requiring drive shafts to span between a front area of the vehicle and the rear area of the vehicle and/or frame assembly configurations. Illustratively, with reference again to FIG. 12, a floor area or foot area 99 available for rear seating 44 is substantially flat providing an even surface for the feet of a passenger seated within rear seating. Additionally, floor or foot area 99 provides a surface for storing various items and increasing the space available for storing cargo when rear seats 46, 48 are in the folded configuration. This substantially flat configuration of floor area 99 may be facilitated through the incorporation of the electrical powertrain assembly 50 and the design of frame assembly 10. For example, in using an electric powertrain assembly 50, various gasoline-based components, such as an internal combustion engine, that were previously occupying at least a portion of floor area 99 or forcing curvature of floor area 99 at rear seating area 44 may be eliminated. Additionally, a prop or drive shaft that may otherwise extend rearwardly and/or upwardly into floor areas 98 and 99 may be eliminated with incorporation of electronic powertrain assembly 50.

As previously mentioned, powertrain assembly 50 may include at least one battery 52. In some examples, frame assembly 10 may be configured to accommodate battery 52 underneath at least one of the seats, for example, left rear seat 46, right rear seat 48, or both. For example, as illustrated in FIG. 12, a gap 88 extends between a seat base and floor area 98 of vehicle 2 which may be configured for supporting battery 52. Battery 52 may be accommodated beneath any of seats 42, 46, 48. In some examples, the at least one battery 52 may include a plurality of batteries, and each respective battery of the plurality of batteries may be accommodated beneath seats one or more of 40, 42, 46, 48, or combinations thereof. For example, at least one first of the plurality of batteries may be disposed under at least a portion of operator seat 40, passenger seat 42, or both and at least one second battery of the plurality of batteries may be disposed under at least a portion of left rear seat 46, right rear seat 48, or both.

Additionally, with reference to FIG. 12A, configuration of powertrain assembly 50 and frame assembly 10 may provide the advantage that rear wheels 8 (shown in phantom) are tucked under and laterally within an outboard frame panel of rear seats 46, 48 of rear seating area 44. In other words, as illustrated, frame assembly 10 has curved frame members 82 which represents the outboard frame panel that receives rear wheels 8 (shown in phantom) and aids in maintaining a target wheel-base distance while accommodating rear seating 44 and rear cargo area 30. An advantage, among others, of this arrangement is the enablement of a shorter wheel base, such as less than a 90-inch wheel base, while still enabling leg room sufficient for a full-size adult occupant. Rear seats 46, 48 are moved inboard, such that wheel well may occupy at least a portion of the space between the outmost portion of the respective seat and the outmost portion of the respective side of the vehicle. Another advantage, among others, of this arrangement is the provision of better line of sight for rear seat occupants.

Figure 15:
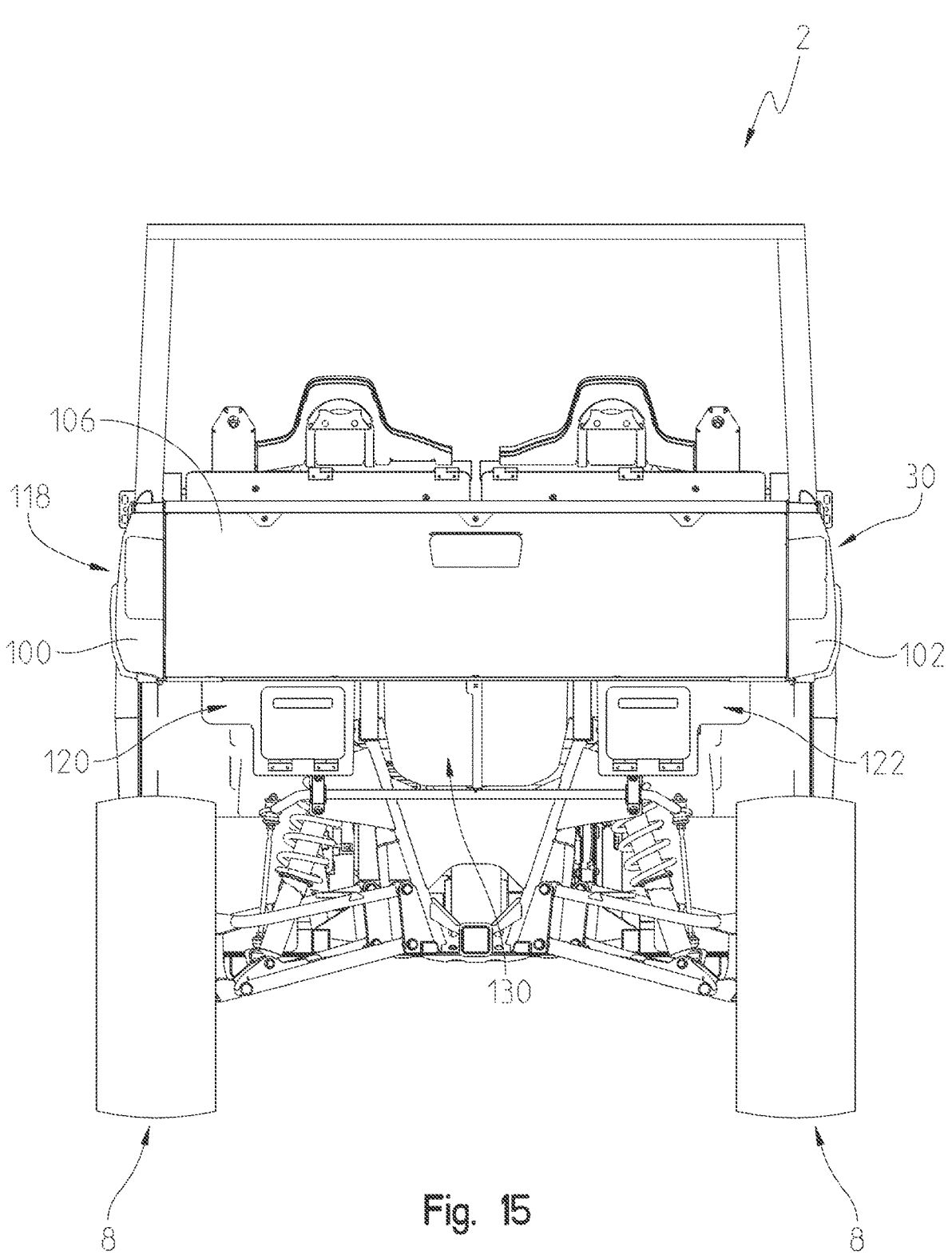
FIG. 15 is a rear view of a cargo area of the utility vehicle of FIG. 1.

With reference now to FIGS. 15-24, available space for storing cargo within vehicle 2 will be described further herein. For example, FIG. 15 is a rear view of vehicle 2 illustrating rear cargo area 30 defined by a cargo box 118 and a plurality of storage compartments underneath cargo box 118. As illustrated, vehicle 2 comprises a first side panel 100 opposite a second side panel 102. Panels 100, 102 may define rear body panels or fenders and generally provide the lateral width of cargo box 118. Cargo box 118 includes a floor panel 104 extending between first and second side panels 100, 102. Cargo box 118 further includes a tailgate 106 (FIG. 15) extending between first and second side panels 100, 102. As illustrated, floor panel 104 includes a plurality of ribs 110 extending between a forward longitudinal extent 112 and a rearward longitudinal extent 114 of floor panel 104. Ribs 110 may be configured to improve structural rigidity of floor panel 104, to aid in the securing of tools or storage within cargo box 118, and/or to define fluid channels within floor panel 104 for directing fluid out of cargo box 118. Further, floor panel 104 may include openings or access points 116 for receiving tie downs (not shown) to secure cargo to floor panel 104.

Figure 17:
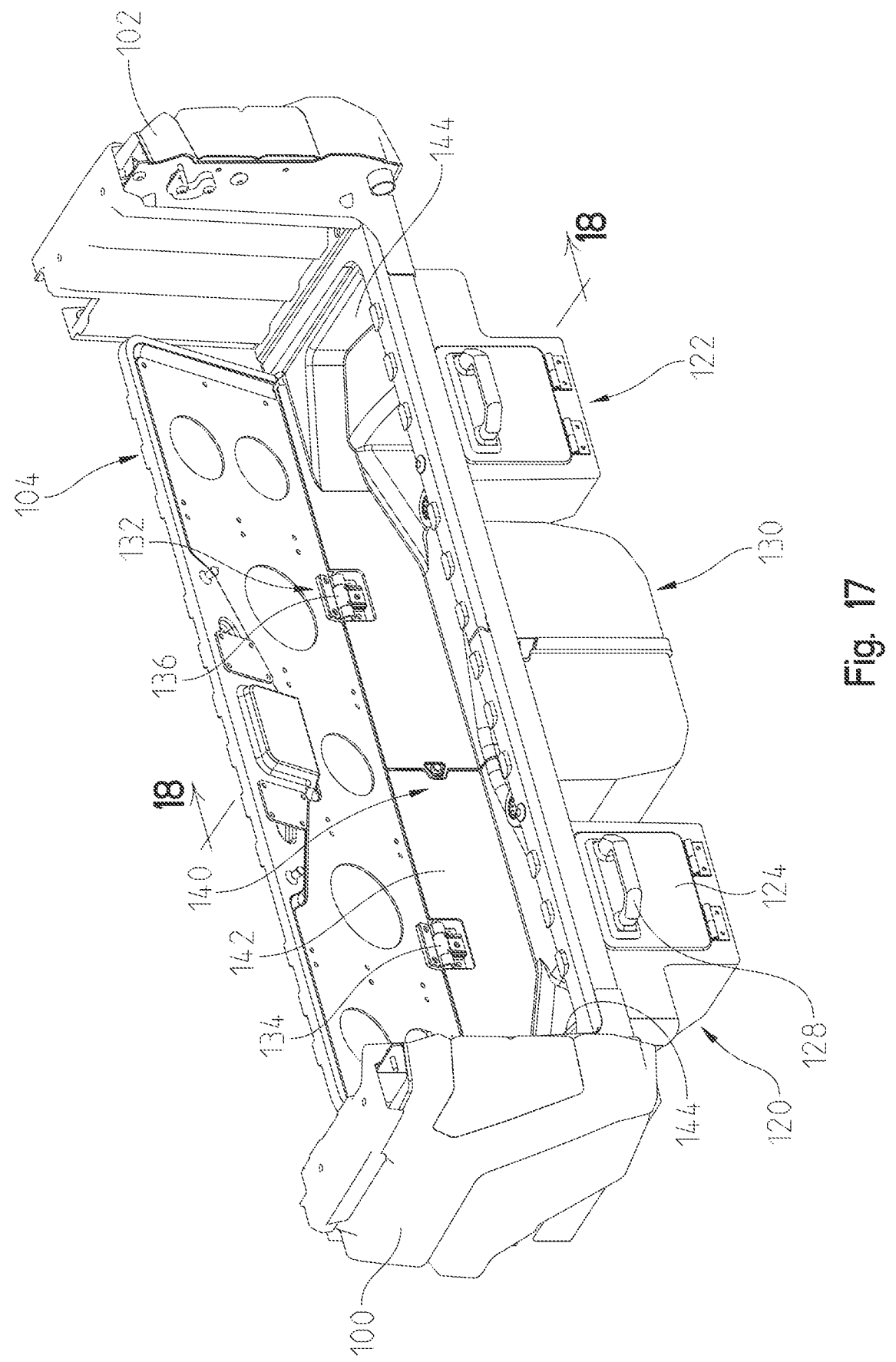
FIG. 17 is a rear perspective view of the portion of the cargo area of FIG. 15 in an open configuration.

Illustratively, rear cargo area 30 further includes a first storage compartment 120 arranged below floor panel 104 on a first side of rear cargo area 30 and thus below and adjacent to first side panel 100. Rear cargo area 30 further includes a second storage compartment 122 arranged vertically below floor panel 104 laterally aligned with first storage compartment 120. In other words, the second storage compartment 122 is arranged adjacent second side panel 102. As illustrated, each of first storage compartment 120 and second storage compartment 122 are generally rectangular in shape such that the first storage compartment 120 and second storage compartments 122 form a rectangular bin for supporting accessories, however any other shape of storage compartment 120, 122 may be used. As illustrated in FIG. 17, cargo area 30 further includes a third storage compartment arranged laterally between the first storage compartment 120 and the second storage compartment 122. As illustrated best in FIG. 17, internal storage regions of each of first, second and third storage compartments 120, 122 and 130 define a rear storage bin 140 formed below a lowermost surface of floor panel 104 and defined by a rear wall 142 and side walls 144 opposite one another. Rear storage bin 140 is configured for support and/or storing various accessories or tools carried by the operator during operation of vehicle 2. Floor panel 104 is configured to general conceal the upper opening(s) of rear storage bin 140.

Figure 16:
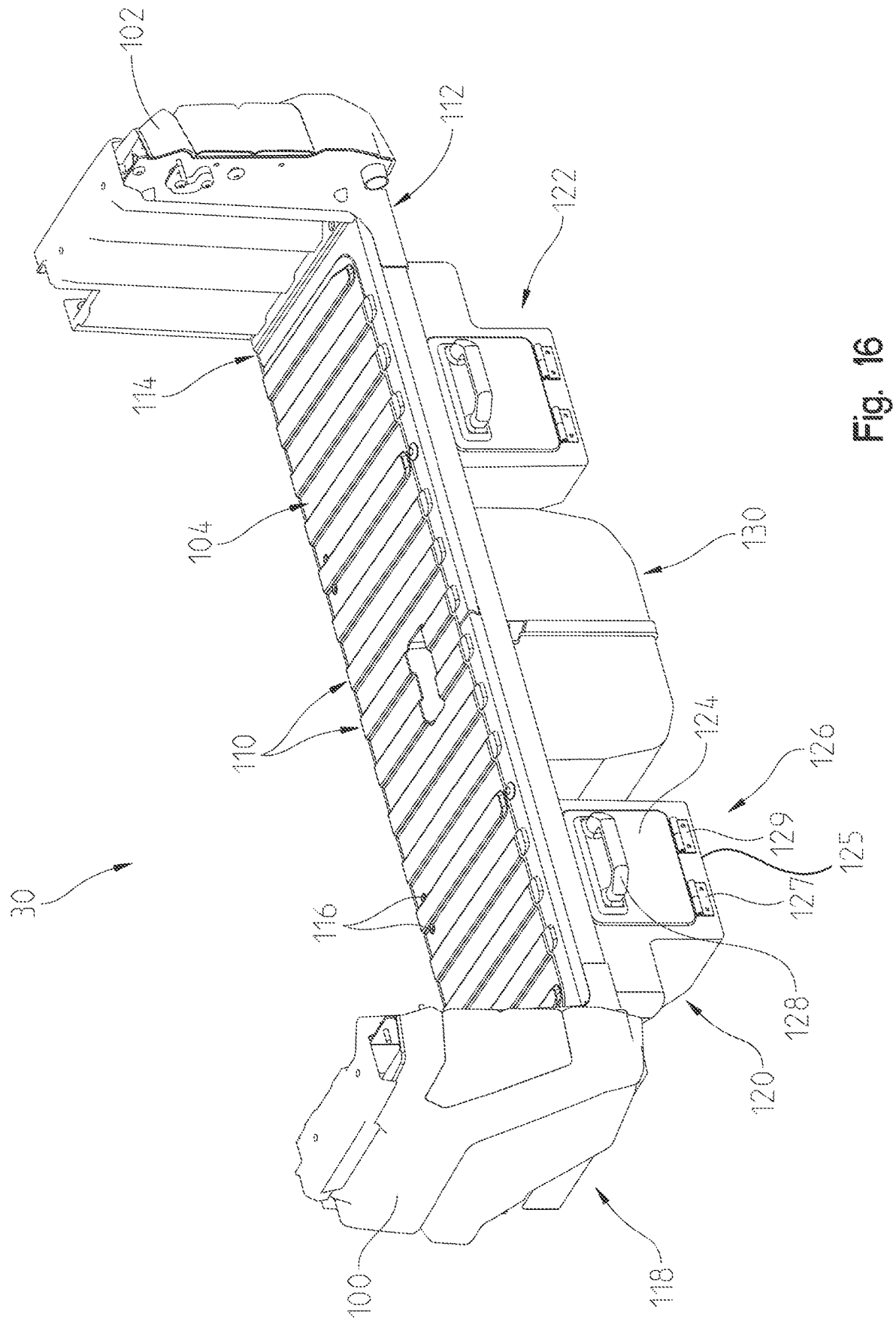
FIG. 16 is a rear perspective view of a portion of the cargo area of the utility vehicle of FIG. 15 in a closed configuration.
Figure 18:
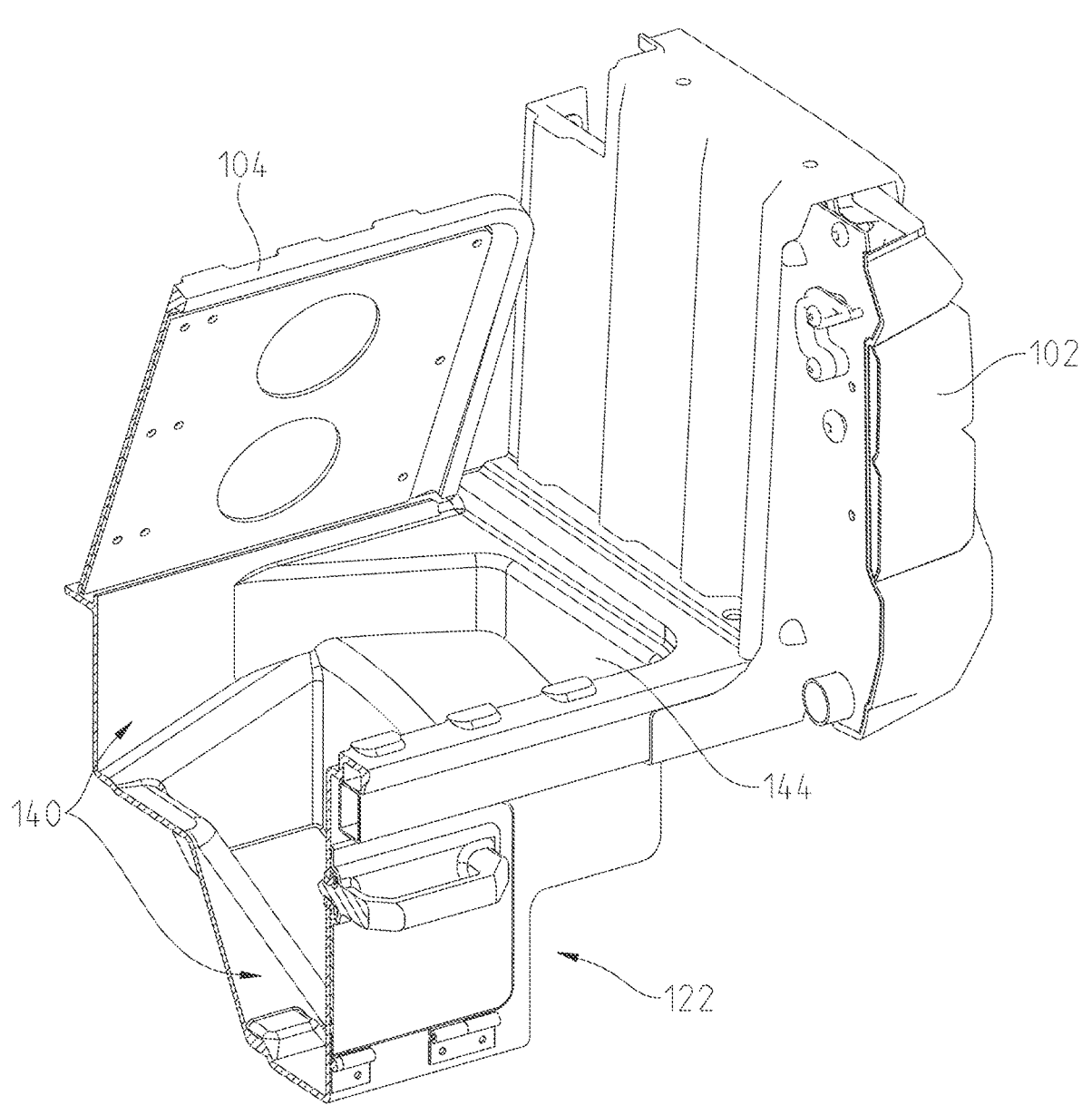
FIG. 18 is a cross-sectional view taken alone line 18-18 of the portion of FIG. 17.

With reference to FIGS. 16-18, actuation for opening and/or closing storage compartments 120, 122, and 130 will be described. While the following description is made primarily with reference to first storage compartment 120, the description may apply to storage compartments 122 and/or 130, as well. As illustrated best in FIG. 16, first storage compartment 120 includes an openable barrier accessible from an exterior of vehicle 2, illustratively a door 124, pivotable coupled with a wall 125 (see FIG. 16) of first storage compartment 120 through a hinge assembly 126. Illustratively, hinge assembly 126 includes a first hinge 127 and a second hinge 129. However, in further embodiments, hinge assembly 126 may include any variety of hinges. Door 124 additionally includes a handle 128 which may be actuated by the user for opening and closing door 124. Upon opening of door 124, access is provided into first storage component 120. Though not illustrated, door 124 and/or another portion of first storage compartment 120 may include a lock or latch mechanism to secure door 124 in an open or closed position. In further embodiments, door 124 may include a seal such that upon being in the closed configuration, first storage compartment 120 is sealingly closed with door 124. In this way, water, debris, or various other particles may not enter first storage compartments 120 while first storage compartment 120 is in the closed configuration. Even further, this may ensure that the that the components or cargo held within the storage compartments 120 and/or 122 does not easily fall out of or exit the storage compartments 120 and/or 122 during operation of vehicle 2.

Further, as illustrated best in FIGS. 16-18, third storage compartment 130 may be accessed through actuation of floor panel 104. More particularly, floor panel 104 may be hingedly connected with rear wall 142 such that floor panel 104 may be actuated into an open position to provide direct access into rear storage bin 140. FIG. 17 illustrates rear cargo area 30 with floor panel 104 hinged to an open position through the use of a hinge assembly 132 which illustratively includes a first hinge 134 and a second hinge 136. However, in further embodiments, hinge assembly 132 may include any variety of hinges or components configured for opening floor panel 104 and maintaining floor panel 104 in the open or closed position. Once floor panel 104 is opened, rear storage bin 140 is accessible to the operator. As illustrated, first, second, and third storage components 120, 122, and/or 130 are configured such that while opening or actuation of storage compartments 120, 122, and/or 130 may be independent of one another, the interior regions of the storage compartments 120, 122, and/or 130 may be continuous and flow into each other to define a single open volume of rear storage bin 140; however, in other embodiments, interior regions of storage compartments 120, 122, and/or 130 may be distinct, separate, and independent from one another such that rear storage bin 140 includes discrete open volumes generally defined at the locations of storage compartments 120, 122, and/or 130. For example, floor panel 104 may be actuated to provide access to second storage component 122 while doors may be actuated for independently accessing first and second compartments 120, 122. In this way, at least one of the storage compartments, illustrative first and second storage compartments 120, 122, are accessible by actuation of an exterior openable barrier, illustratively doors 124, which are positioned vertically lower than floor panel 104. In other embodiments, various other doors and/or actuation methods may be incorporated for opening and closing the various storage compartments 120, 122, 130. Further, any variety of rear storage compartments may be incorporated into vehicle 2 and the above noted storage compartments are only meant to be provided as examples.

Figure 19:
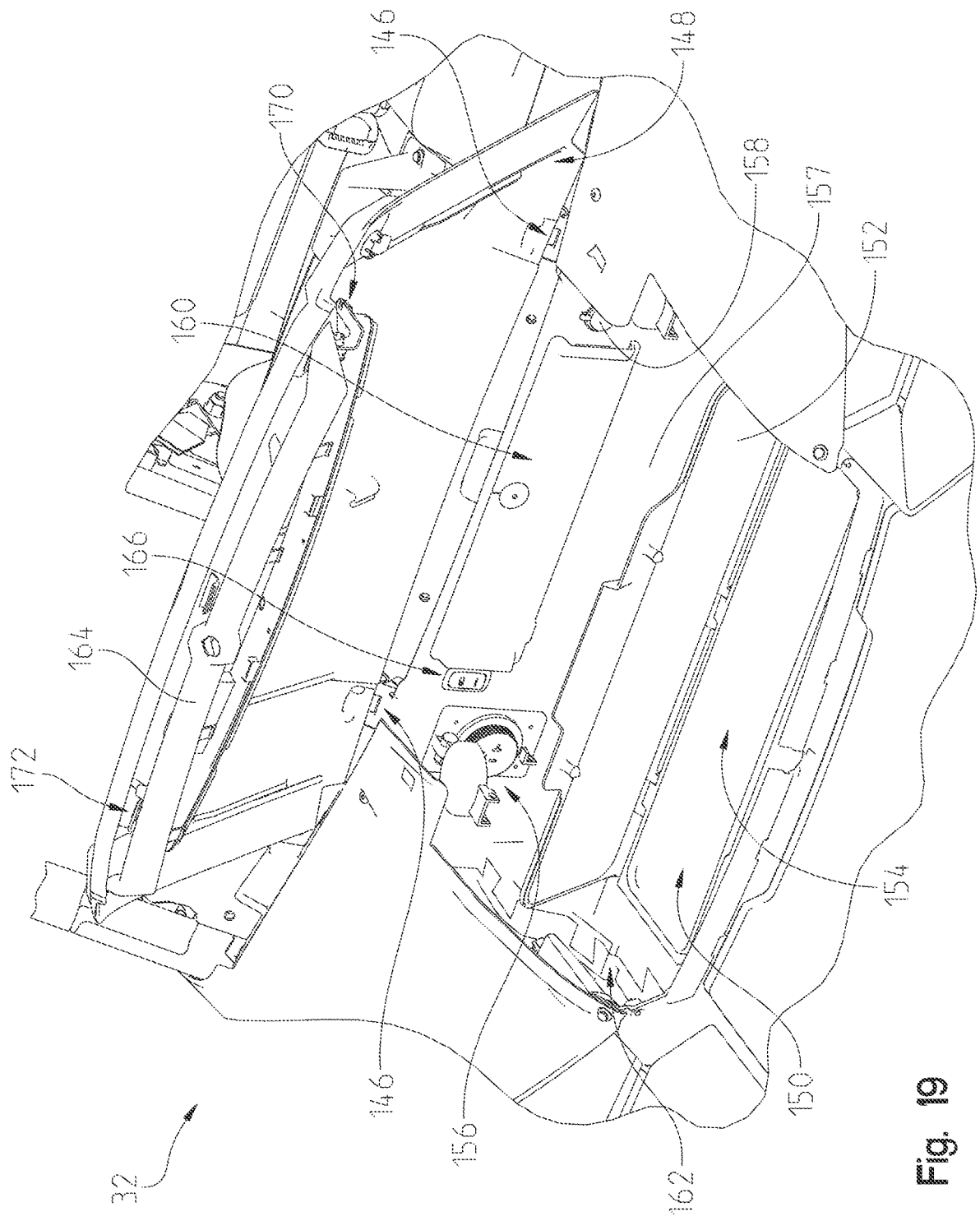
FIG. 19 is a front perspective view of a front cargo area of the utility vehicle of FIG. 1 in an open configuration.
Figure 20:
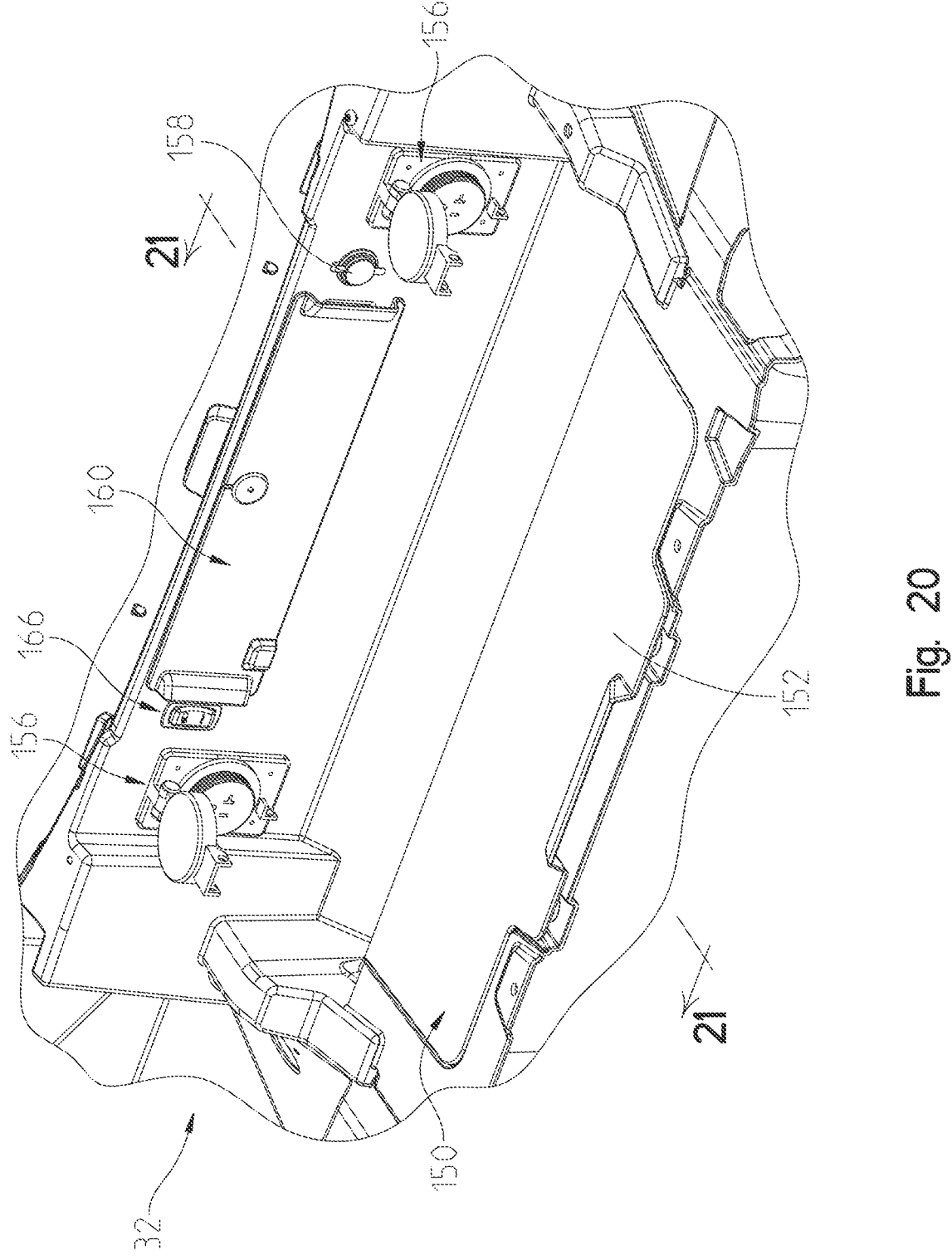
FIG. 20 is a perspective view of an enlarged view of the portion of the front cargo area of FIG. 19 in a closed configuration.

With reference now to FIGS. 19-24, cargo areas that may be integrated with the front of vehicle 2 will be described. The incorporation of electric powertrain assembly 50 may allow for the space available at front of vehicle 2 which is typically used for supporting powertrain components in known vehicles. As illustrated in FIG. 19, front cargo area 32 includes a hood or cargo rack 148 which may be used for opening and/or closing access to an interior region 162 of front cargo area 32. As illustrated in FIG. 19, cargo rack 148 may be actuated into an open configuration due to a hinged or pivotable connection with remainder of front cargo area 32. In some embodiments, front cargo area 32 is connected with cargo rack 148 through a hinge assembly 146. Similar to hinge assembly 132 of floor panel 104, hinge assembly 146 may include at least one or more hinges. Cargo rack 148 and front cargo area 32 are further provided with a sealed engagement such that upon closure of cargo rack 148 to enclose interior region 162 of front cargo area 32, contamination of interior region 162 with any water, particles, or debris in inhibited.

Figure 21:
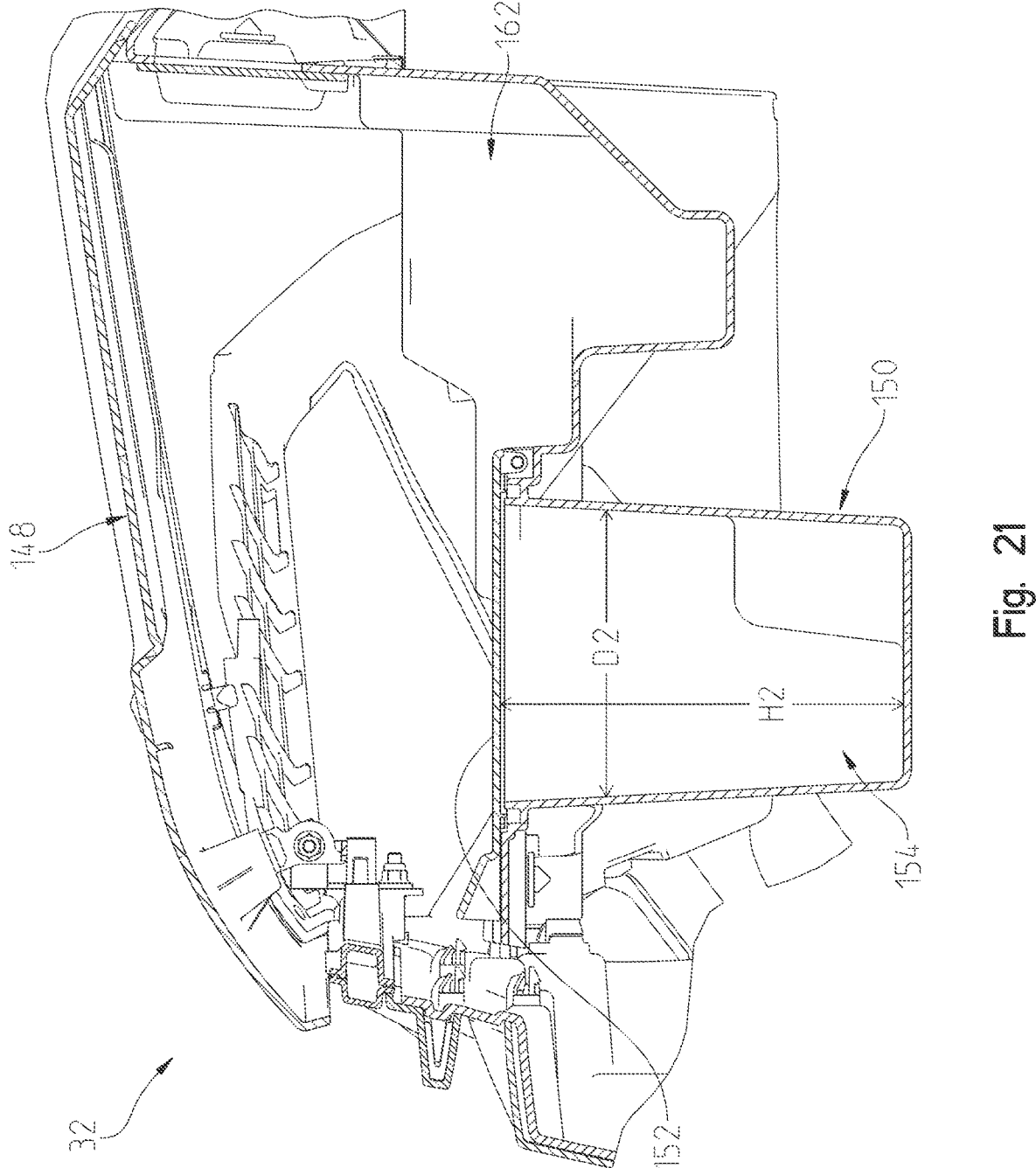
FIG. 21 is a cross-sectional view of the portion of FIG. 20 taken along line 21-21.

With reference now to FIGS. 19-24, front cargo area 32 may be configured for receiving any variety of cargo items. For example, as illustrated in FIG. 21, interior region 162 of front cargo area 32 may include a storage bin 150 which may have a cover 152 rotatably coupled with storage bin 150 to reversibly enclose an interior region 154 of storage bin 150, allowing for access to be prohibited and/or restricted into storage bin 150. In this way, front cargo area 32 may be configured for receiving cargo and there may additional smaller storage compartments arranged therein for storing and locking items therewithin. While only illustrated as having one storage bin, front cargo area 32 may include any number of storage bin. In some embodiments, storage bin 150 and cover 152 may be configured such that cover 152 is sealingly engaged with storage bin 150 when in the closed configuration. For example, as illustrated best in FIG. 22, cover 152 includes a plurality of locking mechanisms 200 for securing cover 152 in the closed position. Once in this configuration, any liquid, particles, or debris may be inhibited from entering into storage bin 150. FIG. 21 illustrates a cross-sectional view taken along line 21-21 illustrating interior region 154 of storage bin 150 in combination with cargo rack 148. As illustrated, interior region 154 as a height H2 and a depth D2 configured for receiving and storing cargo.

Further, with reference still to FIGS. 19-22, front cargo area 32 additionally includes at least one outlet 156 which may be connected to a power source, such as battery 52, of powertrain assembly 50 to provide power to various accessories or cargo. Alternatively or additionally, rear cargo area 30 includes at least one outlet which may be connected to a power source, such as battery 52, of powertrain assembly 50 to provide power to various accessories or cargo. As illustrated, a wall 157 of front cargo area 32 includes outlet 156 arranged therein. In some embodiments, chargers may be coupled with outlet 156 to provide charge to various accessories and tools that are supported within front cargo area 32. In some embodiments, front cargo area 32 may include two or more outlets for coupling with accessories. Further, as illustrated in FIG. 19, front cargo area 32 further includes a charge port 158, such as a 12V socket or USB port, which may additionally be used for charging accessories being stored within front cargo area 32. Outlet 156 and/or charge port 158 may be configured to output 12V, 120V, or any other suitable selected power output. Further, front cargo area 32 may additionally include an access panel 160 configured for providing access to an operator for servicing components within vehicle 2, for example under a dashboard of vehicle 2. Various other accessories or components may be incorporated into front cargo area 32 to optimize front cargo area 32 as being a workstation available for the operator. For example, cover 152 may act as a flat surface for operator to use as a work area while utilizing any tools or cargo stored within front cargo area 32. Additionally, tools may be attached directly onto the underside of cargo rack 148 and/or cover 152 for supporting additional tools within vehicle 2. Even further, front cargo area 32 may be equipped with an air compressor set for providing capability to inflate equipment for recreational activities that may be carried within vehicle 2 and/or for inflating or adjusting tire pressure within ground engaging members 4 during operation.

Figure 22:
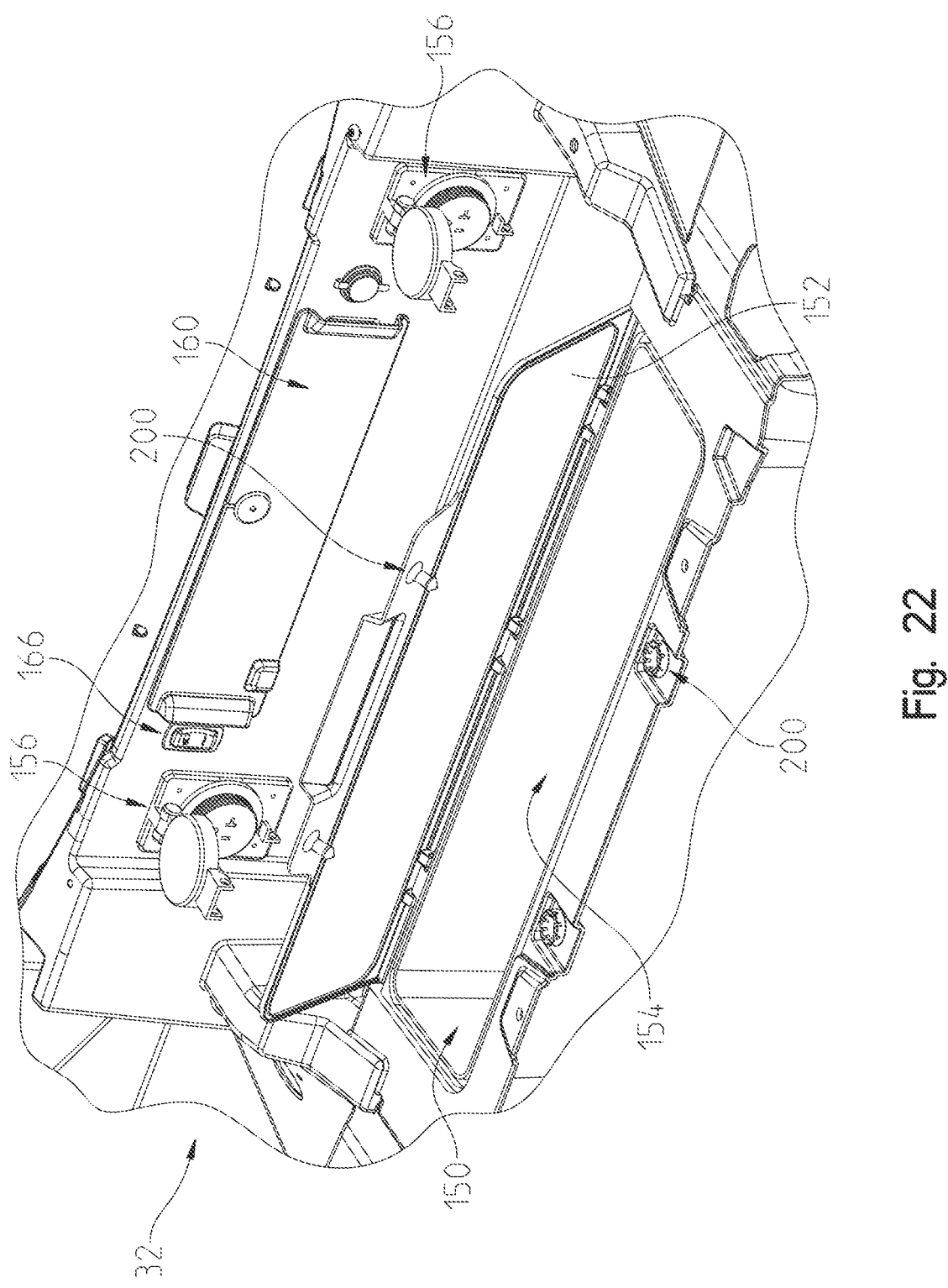
FIG. 22 is a perspective view of an enlarged view of the portion of the front cargo area of FIG. 19 in an open configuration.
Figure 23:
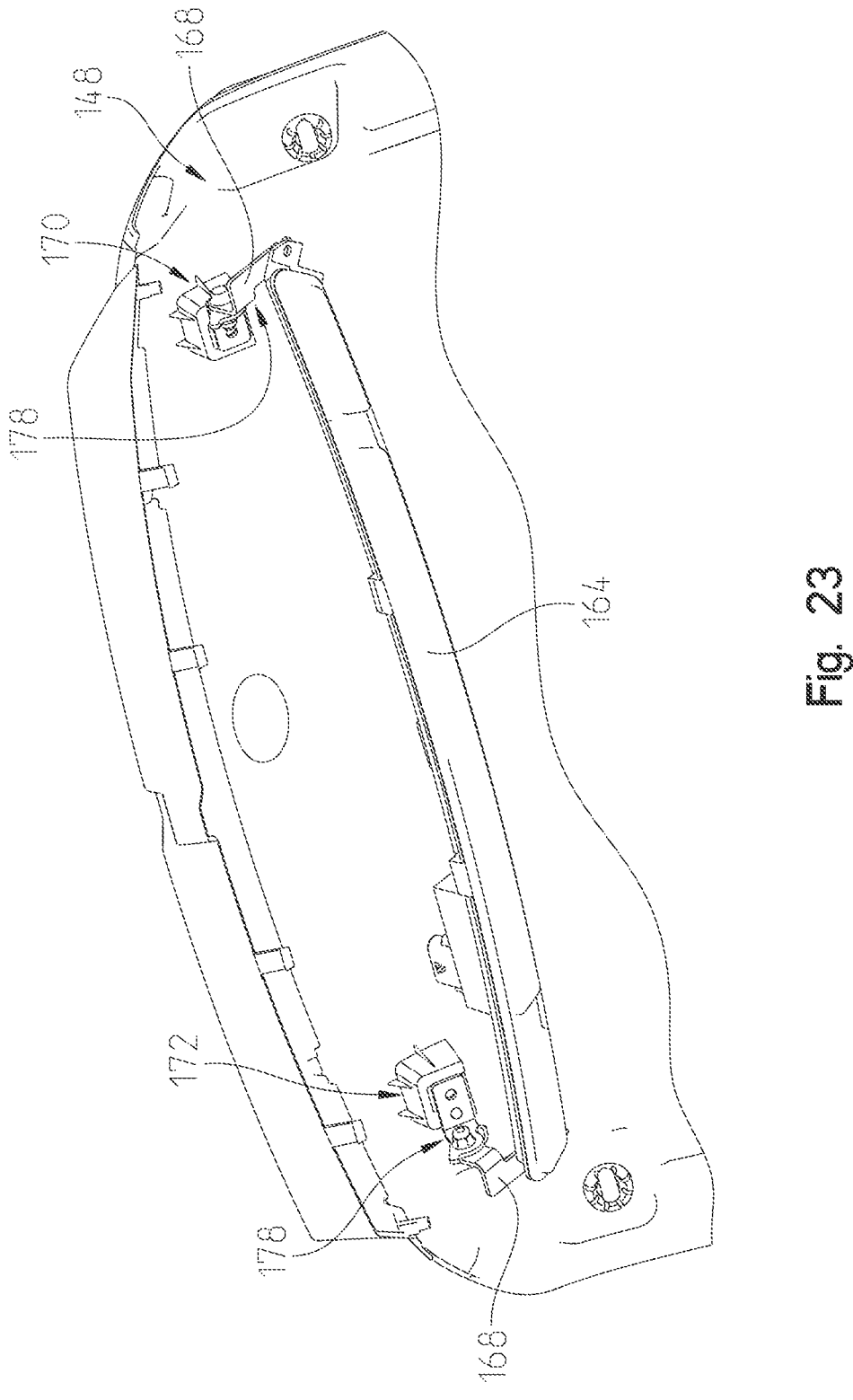
FIG. 23 is a perspective view of an enlarged portion of a feature of the front cargo area of FIG. 19.
Figure 24:
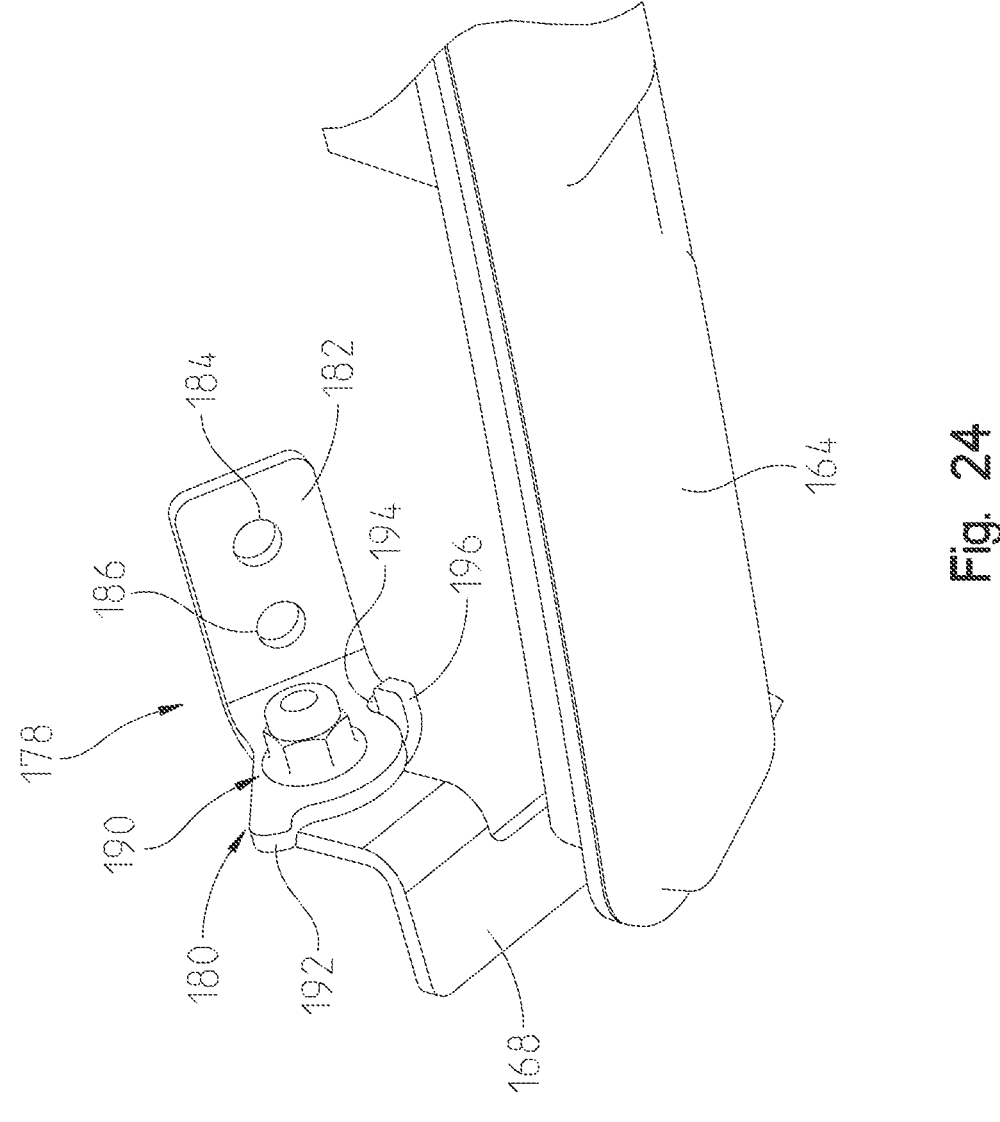
FIG. 24 is a perspective view of an enlarged portion of a fastening mechanism for coupling the feature of FIG. 23 to the front cargo area.

With reference still to FIGS. 22-24, front cargo area 32 may additionally include a light source. For example, FIG. 22 illustrates a light bar 164 coupled with cargo rack 148, and more particularly an underside of cargo rack 148. In this way, light bar 164 may produce light for shining into interior region 162 of front cargo area 32. This may ease the ability with which front cargo area 32 can be used as a workstation to ensure visibility for the operator. As illustrated, front cargo area 32 includes a light switch 166 which may be actuated for turning light bar 164 on or off. However, in some embodiments, light bar 164 may be configured such that actuation of cargo rack 148 to open cargo rack 148 automatically causes light bar 164 to turn on. In further embodiments, other mechanisms for actuating light bar 164 may additionally be incorporated such as a switch, dial, or a timer.

As illustrated, light bar 164 is coupled with the underside of cargo rack 148 through the use of a first fastening mechanism 170 and a second fastening mechanism 172. As illustrated, cargo rack 148 comprises a first protrusion 174 and a second protrusion 176 configured for engaging with the fastening mechanisms. For example, as illustrated in FIG. 23 and the enlarged view of FIG. 24, light bar 164 includes at least one post 168 coupled with a bracket 178 having a rounded portion 180 attached with a rectangular portion 182. Rectangular portion 182 has a first opening 184 adjacent a second opening 186. Rounded portion 180 additionally has an opening (not shown) that receives a bolt 190 for coupling post 168 with bracket 178. Openings 184, 186 are configured for alignment with protrusions 174, 176 for coupling bracket 178 with protrusions 176, 176 of cargo rack 148. In this way, fastening means such as bolts or screwed may be received within openings 184, 186 to couple light bar 164 with cargo rack 148.

With reference again to the enlarged view of FIG. 24, rounded portion 180 includes at least two stop surfaces 192, 194 which may engage with a protrusion 196 extending from post 168. In this way, upon actuation of cargo rack 148 into the open position, post 168 and protrusion 196 are capable for rotation between stop surfaces 192, 194 of rounded portion 180 to provide flexibility in movement of light bar 164. While described above as having a light bar 164 and access panel 160, any variety of features or accessories may be incorporated into front cargo area 32 for maximizing the ability of front cargo area 32 to support cargo. The above recited features are merely examples of what may be incorporated.

Figures 25A, 25B, 25C:
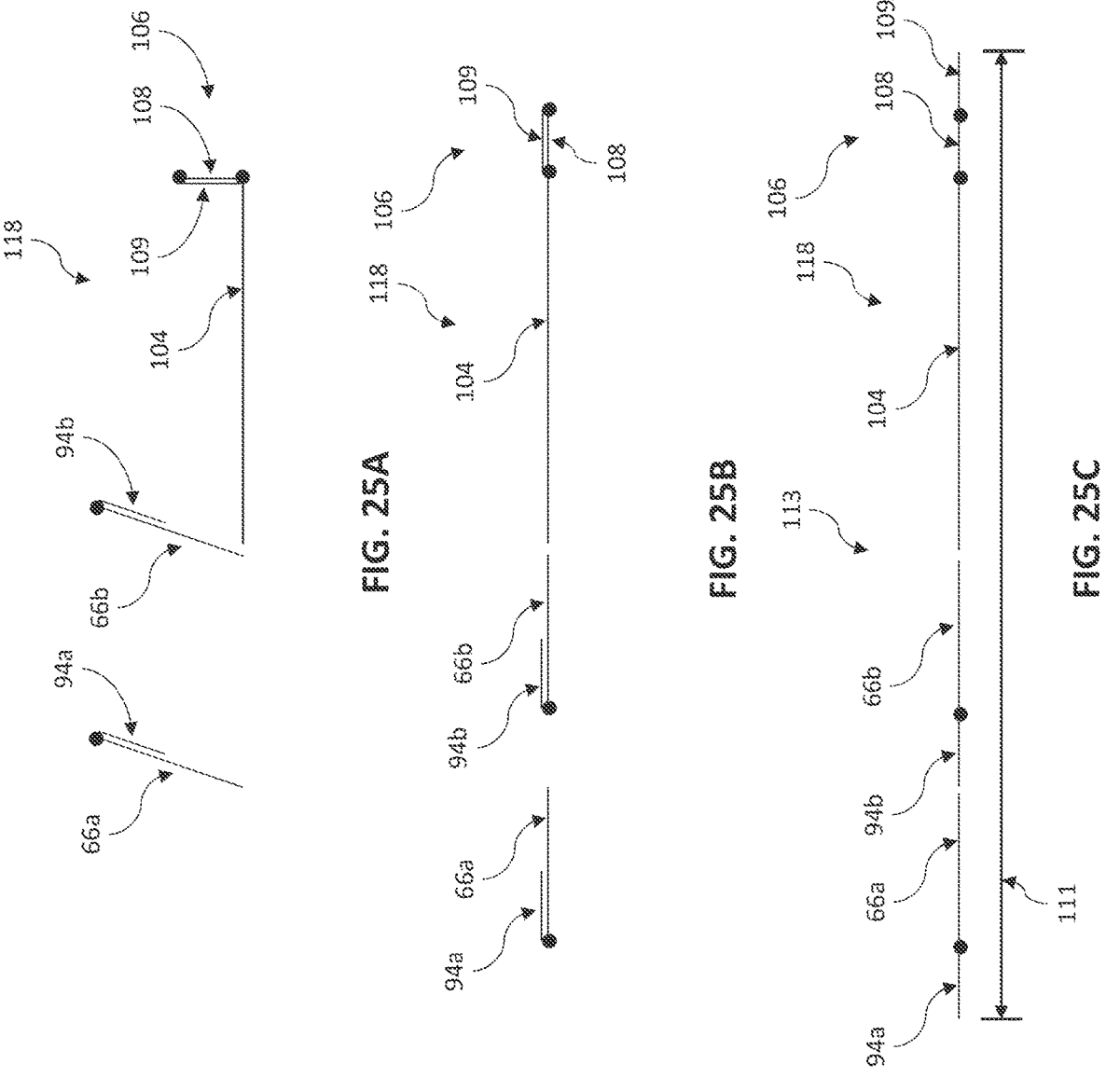
FIG. 25A is a representative view of seating and a cargo box having an extendable tailgate.
FIG. 25B is the seating and cargo box of FIG. 25A with the seating in a lowered position and the tailgate in a lowered position.
FIG. 25C is the seating and cargo box of FIG. 25B with panels coupled to the seating in extended positions and the tailgate in an extended position.

In embodiments, one or more of passenger seats 66 and rear cargo area 30 cooperate to form a storage area having a generally horizontal support surface. In embodiments, the storage area has a length of at least 8 feet. In embodiments, the storage area has a length of at least 10 feet. In embodiments, the storage area has a length ranging from 8 feet to 10 feet. Referring to FIGS. 25A-C, an exemplary storage area 113 (see FIG. 25C) formed from the cooperation of passenger seat 66a, passenger seat back 66b, and cargo box 118 is shown.

In FIG. 25A, passenger seat backs 66a, 66b are shown in their raised positions and panels 94a and 94b are in their stored positions. Tailgate 106 of cargo box 118 is in its raised position. In the illustrated embodiment, tailgate 106 includes a base 108 rotatably coupled to floor panel 104 of cargo box 118, such as with hinges, and an extendable portion 109 rotatably coupled to base 108, such as with hinges. Extendable portion 109 has a stored position (see FIGS. 25A and 25B) and an extended position (see FIG. 25C). Exemplary tailgates with extendable portions are disclosed in U.S. Provisional Application Ser. No. 63/329,543, filed Apr. 11, 2022, titled UTILITY VEHICLE, the complete disclosure of is expressly incorporated by reference herein. The vehicle of claim 11, further comprising a cargo box having a floor panel, a first side panel extending vertically upward form the floor panel, and a second side panel opposite the first side panel and extending vertically upward from the floor panel, the cargo box being positioned rearward of the seating area.

In FIG. 25B, passenger seat backs 66a, 66b are in their lowered position while panels 94a, 94b remain in their respective stored positions (see FIG. 13A) and tailgate 106 is shown in its lowered position while extendable portion 109 remains in its stored position. In FIG. 25c, passenger seat backs 66a, 66b are in their lowered position and panels 94a, 94b are in their respective extended positions (see FIG. 13B) and tailgate 106 is shown in its lowered position while extendable portion 109 in its extended position. In the arrangement shown in FIG. 25c, panel 94a, seat back 66a, panel 94b, seat back 66b, floor panel 104, tailgate base 108, and tailgate extendable portion 109 cooperate to form a support surface for a generally horizontally extending storage area having a length 111. In embodiments, length 111 is at least 8 feet. In embodiments, length 111 is at least 10 feet. In embodiments, length 111 ranges from 8 feet to 10 feet. In some embodiments, when extendable portion 109 in its extended position, accessory retaining features may be coupled with extendable portion 109 for securing tools and/or other cargo. For example, similar to as previously described, in some embodiments, ties, ropes, cords, clamps, and/or a retainer system, e.g., as described above, may be incorporated with extendable portion 109 and used as the coupling mechanism described herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:
a frame including an upper frame portion and a lower frame portion;
front and rear ground engaging members supporting the frame;
an electric powertrain drivingly coupled to at least one of the front and rear ground engaging members;
an operator area supported by the frame; and
a rear cargo area arranged longitudinally rearward of the seating area, the rear cargo area defined by:
a cargo box having a floor panel, a first side panel extending vertically upward form the floor panel, and a second side panel opposite the first side panel and extending vertically upward from the floor panel; and
at least one storage compartment arranged vertically below at least a portion of the floor panel, wherein the at least one storage compartment comprises a plurality of discrete interior regions, and the plurality of discrete interior regions includes at least a first discrete interior region accessible by a movement of at least a portion of the floor panel and further being accessible by an exterior openable barrier positioned lower than the floor panel.

2. The vehicle of claim 1, wherein the plurality of discrete interior regions includes at least a first discrete interior region and a second discrete interior region, the first discrete interior region being accessible through a first exterior openable barrier positioned lower than the floor panel and the second discrete interior region being independently accessible through a second exterior openable barrier positioned lower than the floor panel.

3. The vehicle of claim 1, wherein the plurality of discrete interior regions comprises a first interior region, a second interior region, and a third interior region, and wherein the floor panel is hingedly coupled with the rear wall such that actuation of the floor panel between a closed position to an open position provides access into at least one of the first interior region, the second interior region, and the third interior region.

4. The vehicle of claim 1, wherein the at least one storage compartment comprises a door hingedly coupled with a wall of the storage compartment such that actuation of the door provides access into the at least one storage compartment.

5. The vehicle of claim 1, wherein the seating area is defined by at least one passenger seat having a seat base and a seat back, and wherein the seat back includes a panel coupled with a rear surface of the seat back, the panel configured for actuation into an extended configuration to increase surface area available for storage.

6. The vehicle of claim 1, wherein the vehicle further includes a front cargo area arranged longitudinally forward of the operator area.

7. The vehicle of claim 6, wherein the front cargo area defines an interior region and includes a cargo rack rotatably coupled with the front cargo area, and wherein the front cargo area further includes at least one storage bin included in the interior region, the storage bin having a cover hingedly coupled with the storage bin.

8. The vehicle of claim 7, wherein the cargo rack includes a light bar coupled to an underside of the cargo rack, and wherein a power supply to the light bar is automatically controlled by actuation of the cargo rack into an open configuration.

9. The vehicle of claim 6, wherein a wall of one of the front cargo area and the rear cargo area further includes at least one power outlet configured for providing power to at least one accessory.

10. A vehicle comprising:
a frame including an upper frame portion and a lower frame portion, the lower frame portion having a front lower frame portion, an intermediate lower frame portion, and a rear lower frame portion;
front and rear ground engaging members supporting the frame;
an electric powertrain comprising one or more batteries electrically coupled to at least one inverter that is configured to supply a selected power to at least one motor that is configured to transfer via at least one gearcase mechanical power to at least one of the front and rear ground engaging members; and
a seating area supported by the frame, the seating area including a front seating area and a rear seating area, the rear seating area having at least one seat including a seat base and a seat back, a floor area having a substantially flat profile, and at least one of the one or more batteries positioned in a gap extending vertically between the seat base and the floor area.

11. The vehicle of claim 10, wherein the at least one gearcase is arranged within the front lower frame portion of the frame assembly.

12. The vehicle of claim 10, further comprising a cargo box having a floor panel, a first side panel extending vertically upward form the floor panel, and a second side panel opposite the first side panel and extending vertically upward from the floor panel, the cargo box being positioned rearward of the seating area.

13. The vehicle of claim 12, wherein the seating area is defined by at least one passenger seat having a seat base and a seat back, and wherein the seat back includes a panel coupled with a rear surface of the seat back, the panel configured for actuation into an extended configuration to increase surface area available for storage, wherein the at least one passenger seat and the cargo box cooperate to form a generally horizontal storage area having a length of at least 8 feet.

14. The vehicle of claim 10, wherein the rear seating includes two rear passenger seats each having a seat back, each seat back of each of the two rear passenger seats is configured to rotate downward onto a seat base of the respective rear passenger seat into a folded configuration, and wherein each seat back supports a respective panel coupled to a rear surface of the seat back, the panel being moveable relative to the rear surface of the seat back between a stored position and an extended position such that once the rear passenger seat is in the folded configuration the panel may be moved to the extended position to increase a support surface area available for receiving cargo, the support surface including the seat back of the rear passenger seat and the panel when the panel is in the extended position.

15. The vehicle of claim 10, wherein the upper frame assembly includes a rear portion comprised of a plurality of pillars and at least one storage rack, the at least one storage rack being coupled to the plurality of pillars.

16. The vehicle of claim 15, wherein the at least one storage rack defines a plurality of apertures adapted to couple with at least one accessory.

17. A vehicle comprising:
a frame including an upper frame portion and a lower frame portion;

front and rear ground engaging members supporting the frame;
an electric powertrain drivingly coupled to at least one of the front and rear ground engaging members, the electric powertrain comprising:
at least one battery supported by the frame,
a front motor operatively coupled to the at least one battery, and
a rear motor operatively coupled to the at least one battery;
a seating area supported by the frame having at least one seat, and wherein the at least one battery is arranged vertically beneath the at least one seat;
a rear cargo area arranged longitudinally rearward of the seating area, the rear cargo area defined by a cargo box having a floor panel, a first side panel extending vertically upward form the floor panel, and a second side panel opposite the first side panel and extending vertically upward from the floor panel, and at least one storage compartment arranged vertically below the floor panel, the at least one storage compartment including a plurality of discrete interior regions, wherein the plurality of discrete interior regions includes at least a first discrete interior region accessible by a movement of at least a portion of the floor panel, the first discrete interior region further being accessible by an exterior openable barrier positioned lower than the floor panel; and
a front cargo area arranged longitudinally forward of the seating area, the front cargo area defining an interior region and a cargo rack rotatably coupled with the front cargo area.

18. The vehicle of claim 17, wherein floor panel is rotatably coupled with the at least one storage compartment, and wherein the plurality of discrete interior regions are accessed through actuation of the floor panel into an open position.

19. The vehicle of claim 17, wherein the cargo rack is rotatable between a closed position and an open position, the cargo rack including a light bar coupled with an underside of the cargo rack, and wherein the light bar is actuated upon actuation of the cargo rack into the open position.

* * * * *